United States Patent [19]
Takahashi

[11] Patent Number: 5,875,124
[45] Date of Patent: Feb. 23, 1999

[54] FULL ADDER CIRCUIT

[75] Inventor: Hiroshi Takahashi, Ohi-machi, Japan

[73] Assignee: Texas Instruments Japan Ltd., Tokyo, Japan

[21] Appl. No.: 950,108

[22] Filed: Oct. 16, 1997

Related U.S. Application Data

[63] Continuation of Ser. No. 787,515, Jan. 21, 1997, abandoned, which is a continuation of Ser. No. 391,868, Feb. 22, 1995, abandoned.

[51] Int. Cl.[6] .................................................. G06F 7/50
[52] U.S. Cl. .............................. 364/784.03; 364/784.02
[58] Field of Search ................................ 364/784.01–788

[56] References Cited

U.S. PATENT DOCUMENTS

| | | | |
|---|---|---|---|
| 3,590,230 | 6/1971 | Nordquist | 364/784 |
| 4,564,921 | 1/1986 | Suganuma | 364/784 |
| 4,592,007 | 5/1986 | Ohhashi | 364/784 |
| 4,601,007 | 7/1986 | Uya et al. | 364/784 |
| 4,866,658 | 9/1989 | Mazin et al. | 364/784 |
| 4,870,609 | 9/1989 | Yasui et al. | 364/784 |
| 5,343,418 | 8/1994 | Zinger | 364/784.03 |

*Primary Examiner*—Emmanuel Moise
*Attorney, Agent, or Firm*—Bret J. Petersen; William B. Kempler; Richard L. Donaldson

[57] ABSTRACT

A full adder that operates rapidly with low power supply voltage and minimal power consumption, and further, that occupies a small area on a semiconductor element. A sum signal calculation circuit 10 of full adder 1 performs addition of input signals A and B and carry in signal C and outputs sum signal $S_{out}$. Carry signal calculation circuit 16 outputs carry out signal $C_{out}$ corresponding to the combination of the logic values of input signals A and B and carry in signal C. Sum signal calculation circuit (10) is composed of addition signal generation circuit (12) and sum signal generation circuit (14). Addition signal generation circuit 12 performs XOR logic operations on input signals A and B. Sum signal generation circuit 14 outputs the results of full addition operations on inputs signals A and B and carry in signal C as sum signal $S_{out}$, based on the results of XOR logic operations by addition signal generation circuit (12) and carry in signal C.

6 Claims, 6 Drawing Sheets

FULL ADDER CIRCUIT

This application is a Continuation of application Ser. No. 08/787,515 filed Jan. 21, 1997, now abandoned which is a continuation of prior application Ser. No. 08/391,868, filed Feb. 22, 1995 now abandoned.

FIELD OF INVENTION

The present invention relates to full adder circuits used in digital signal processors (DSP), etc.

BACKGROUND OF THE INVENTION

FIG. 8 shows the construction of conventional full adder 8.

Full adder 8 is constructed of PMOS type transistors Q801–Q804, Q810, Q812, Q813, and Q815, NMOS type transistors Q805–Q808, Q809, Q811, Q814 and Q816, and inverters INV801–INV804. Of these, transistors Q809 and Q810, transistors Q811 and Q812, transistors Q813 and Q814, and transistors Q815 and Q816 are respectively transmission gates 800–806.

Full adder 8 performs full addition for input signals A and B and carry in signal C, that are input through input terminals A, B and C, respectively, shown in FIG. 8. The result is that addition results signal (sum signal) $S_{out}$ obtained is output through output terminal $S_{out}$, and carry out signal $C_{out}$ is output through output terminal $C_{out}$.

Full addition can be rapidly performed for input signals A and B and carry input C with full adder 8, shown as the prior art. However, the circuit that calculates sum signal $S_{out}$ and the circuit that calculates carry out signal $C_{out}$ are constructed very close together in full adder 8, so that a large number of transistor gates are connected to the signal line related to full addition, and the signals related to full addition will pass through a large number of transistors. Thus, there is the problem that the speed of operation of full adder 8 will be noticeably reduced by the effect of the I/O capacitance of the transistors that are not directly used for the operations because of the combinations of input signals A and B, and carry in signal C.

It is possible that the reduction in operating speed of full adder 8 caused by the transistor I/O capacitance can be improved to some extent by countermeasures, such as making the width of each transistor used for full adder 8 large and operating at high current. When measures such as these are taken, however, the area of each transistor in full adder 8 will become larger, and with this the area occupied on the semiconductor elements of full adder 8 will become larger, with the problem being that ultimately the increase in operating speed will not be what was desired. And simultaneously, there will be the problem of increased power consumption. Thus, the problem is that when conventional full adder 8 is used, it is difficult to realize high speed, high integration, and low power consumption simultaneously in the performance of DSP processing.

In addition, by combining the logic values of input signals A and B and carry in signal C, as will be discussed below with references to FIGS. 3 and 4, a difference in the effective capacitance which appears at the signal lines will occur, so the problem is that there will be significant variation in the operating speed of full adder 8. For example, the full addition time corresponding to combining the logic values of input signals A and B and carry in signal C, in a simulation example performed by the present inventors (evaluation with a power supply voltage of 2.7 V), [varied between 1.36–3.57],"D,!,. The problem is basically that the processing cycle of full adder 8 is kept to a worst value of 3.57.

In addition, in conventional full adders, the circuit for calculating the sum signal is generally more complex than the circuit that calculates the carry out signal. Thus the problem is that the processing time needed to calculated the sum signal is much longer than the processing time needed for calculating the carry out signal.

Recently there has been increased demand for processing all signals with a DSP mounted on digital cellular peripheral equipment which uses batteries as the power supply. Full adders for DSP used for this type of application require high-speed processing with low power supply voltage and low power consumption. Nearly all conventional general full adders, however, use circuit technology with 5 V power supply voltage, and in this case, processing will be severely reduced with power supply voltage of 3 V or less. Thus, the problem has been that DSPs that use conventional general full adders are not suitable for equipment that use batteries as the power supply.

My full adder was devised in consideration of the problems of the prior art discussed above. A first object is to provide a full adder that operates at low power supply voltage with minimal power consumption, even during high-speed processing, and which also occupies a small area on a semiconductor element.

In addition, a second object is to provide a full adder with which variation in the processing time corresponding to the combination of each of the input signals, and the processing time needed for calculating sum signals and for calculating carry in signals can be made smaller by reducing the number of transistor gates connected to the signal line related to processing.

In addition, it is a full adder that can be broadly applied to DSP in equipment that utilizes batteries as the power supply, for example, digital cellular communications peripherals, and in which high-speed operation and low power consumption is possible even with a conventional 5V power supply voltage.

SUMMARY OF THE INVENTION

To achieve these objects, a full adder of the present invention has a first signal passing means that passes or blocks a second input signal according to the logic value of a first input signal; a first signal selection means that selects a logic value corresponding to the combination of the aforementioned first input signal and the aforementioned second input signal logic values when the aforementioned first signal passing means blocks the aforementioned input signal, and that outputs the aforementioned second input signal that the aforementioned first signal passing means has allowed to pass, or said selected logic value, as an addition signal; a sum signal generation means that calculates the results of the full addition of the aforementioned first input signal, the second input signal, and a carry in signal, on the basis of the aforementioned addition signal and said carry in signal, and outputs this as a sum signal; and a carry generation means that produces a carry out signal corresponding to the combination of the aforementioned first input signal, the aforementioned second input signal, and the aforementioned carry in signal logic values.

In addition, another full adder of the present invention has a first signal passing means that passes or blocks a second input signal according to the logic value of a first input signal; a second signal selection means that selects the aforementioned first input signal, according to the logic value of the aforementioned second input signal, or the complement of the aforementioned first input signal, when the aforementioned first signal passing means blocks the aforementioned second input signal, and that outputs the aforementioned second input signal that the aforementioned first signal passing means has allowed to pass, or the selected aforementioned first input signal, or the complement of the aforementioned first input signal, as an addition signal; a sum signal generation means that calculates the results of the full addition of the aforementioned first input signal, the second input signal, and a carry in signal, on the basis of the aforementioned addition signal and said carry in signal, and outputs this as a sum signal; and a carry generation means that produces a carry out signal corresponding to the combination of the aforementioned first input signal, the aforementioned second input signal, and the aforementioned carry in signal logic values.

The first signal passing means pertaining to the present invention is constructed of transistor gates controlled by a first input signal (input signal A) and a first input signal with its logic value complemented. The first signal passing means passes or blocks a second input signal (input signal B) according to the logic value of the first input signal, so that the delay time from when the first input signal is input into the relevant full adder until it is fed to the first signal selection means pertaining to the present invention will be minimal.

The first signal passing means pertaining to the present invention is composed of two PMOS transistors connected in series between the output terminal of the aforementioned first signal passing means and the positive power supply ($V_{DD}$) and 2 NMOS transistors connected in series between the output terminal of the aforementioned first signal passing means and the negative power supply ($V_{SS}$), or of 1 PMOS transistor and 1 NMOS transistor connected between the output terminal of the aforementioned first signal passing means and input terminal A. A logical 1, a logical 0, or the second input signal supplied from the first signal passing means is selected according to the combination of the first input signal and the second input signal logic values, and the results of addition will be rapidly calculated without considering the carry signal for the first and second input signals.

That is, the first signal passing means and the first signal selection means cooperatively and rapidly perform an XOR operation for the first input signal and the second input signal, and this is output as an addition signal.

The sum signal generation means pertaining to the present invention is constructed of two transistor gates that are controlled by a carry in signal or an addition signal. It selects an addition signal or a complemented addition signal, or a carry signal or a complemented carry signal, according to the control of these signals and produces a sum signal.

The transistors that constitute the transistor gates have no amplifying effect on the signals passed, so that they simply delay the signals passed. Thus, in the full adder of the present invention, high-speed operation is achieved by designing the circuit so that the number of transistor gate stages through which signals continually pass is two or less, with no intervening logic circuits, and at the same time the area occupied on the semiconductor element is made smaller by using only a simple NOT gate for the logic circuit through which signals pass.

The carry generation means pertaining to the present invention calculates a carry out signal at high speed based on the first input signal, second input signal and carry in signal.

There are three types of carry generation means used for the full adder of the present invention: the type that calculates a carry out signal by performing logic operations on the first input signal, the second input signal and the carry in signal; the type that calculates a carry out signal using an addition signal independently calculated by a circuit that resembles a sum signal generation means; and the type that generates a carry signal using an addition signal by means of a circuit that resembles a sum signal generation means.

Carry signal generation means thusly configured are used in accordance with their increase in speed of operation of the full adder and the area that they occupy on the semiconductor element.

DESCRIPTION OF THE DRAWINGS

FIG. 1A shows a sum signal calculation circuit, and FIG. 1B shows a carry signal calculation circuit.

In the figures, 1–5 are full adders, 10, 20 sum signal calculation circuits, 12, 22 addition signal generation circuits, 14, 24, 46 sum signal generation circuits, 16, 26, 44 carry signal calculation circuits, 30, 40, 42, 50 XOR gates, 32 an XNOR gate, 34, 52 carry signal/sum signal calculation circuits, 100–104, 200–204, 300–310, 400–410 transmission gates, INV101–INV104, INV121, INV201–INV204, INV221, INV301–INV304, INV401–INV407, INV501 inverters, and Q100–Q109, Q121–Q132, Q210–Q208, Q221–Q230, Q301–Q318, Q401–Q416 are transistors.

DETAILED DESCRIPTION

Embodiment 1

A first embodiment of the present invention will be explained with reference to FIGS. 1A and 1B (hereafter together "FIG. 1").

Figure 1A:
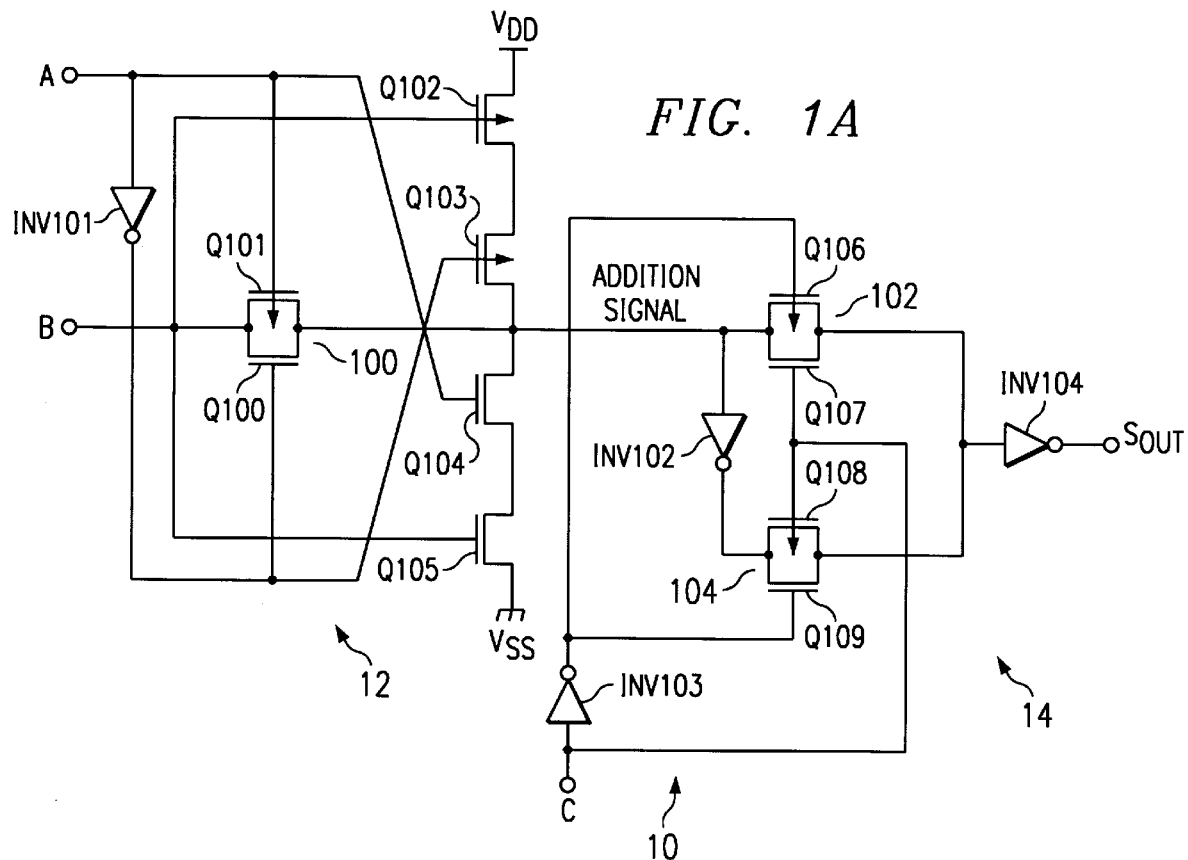
FIGS. 1A and 1B are schematics of a first embodiment of a full adder of the present invention.
Figure 1B:
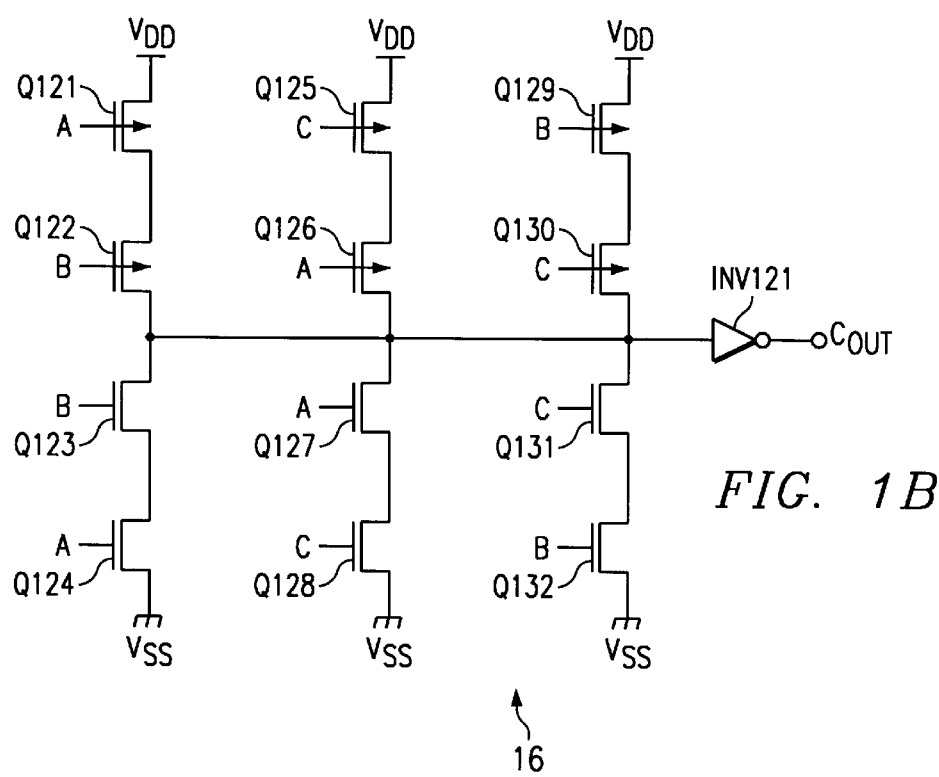

FIG. 1A shows a sum signal calculation circuit 10 and FIG. 1B shows a carry signal calculation circuit 16.

First, an overview of the constitution and operation of full adder 1 will be explained.

As shown in FIGS. 1A and 1B, full adder 1 is composed of sum signal calculation circuit 10 and carry signal calculation circuit 16; it performs full addition of input signals A and B and carry in signal C.

Sum signal calculation circuit 10 is composes of addition signal generation circuit 12 and sum signal generation circuit 14; it performs addition of input signals A and B and carry in signal C and outputs the results as sum signal $S_{out}$.

Carry signal calculation circuit 16 calculates and outputs carry out signal $C_{out}$ based on input signals A and B and carry in signal C.

In sum calculation circuit 10, addition signal generation circuit 12 rapidly performs an XOR (exclusive logical sum) logic operation on input signals A and B that have been input from input terminals A and B, respectively, and inputs the results of this operation as an addition signal to sum signal generation circuit 14.

Sum signal generation circuit 14 outputs the results of full addition operations on input signals A and B and carry in signal C based on the addition signal input from addition signal generation circuit 12 and on carry in signal C input from input terminal C as sum signal $S_{out}$.

Full adder 1 is composed of NMOS transistors Q100, Q104, Q105, Q107, Q109, Q123, Q124, Q127, Q128, Q131 and Q132, PMOS transistors Q101, Q102, Q103, Q106, Q108, Q121, Q122, Q125, Q126, Q129 and Q130, and inverters INV101–INV104 and INV121.

Of these transistors, transistors Q100 and Q101, transistors Q106 and Q107, and transistors Q108 and Q109 constitute transmission gates 100, 102, and 104, respectively.

In addition, of these structural elements, transmission gate 100, inverter INV101 and transistors Q102–Q105 constitute addition signal generation circuit 12. Transmission gate 102 and 104 and inverters INV102–104 constitute sum signal generation circuit 14. Transistors Q121–Q132 and inverter INV121 constitute carry signal calculation circuit 16.

Next, the circuit connections of sum signal calculation circuit 10 will be explained, with references to FIG. 1(A).

Input signal A (first input signal) input from input terminal A is directly input to the gate of transistor Q101 of transmission gate 100 and to the gate of transistor Q104, and is input via inverter INV101 to the gate of transistor Q100 of transmission gate 100 and to the gate of transistor Q103.

Input signal B (second input signal) input from input terminal B is input to the input terminal of transmission gate 100 and to the gates of transistors Q102 and Q105.

Transistors Q102 and Q103 are connected in series between the output terminal of transmission gate 100 and positive power supply $V_{DD}$; input signal B and complemented input signal A are input to their gates, respectively.

Transistors Q104 and Q105 are connected in series between the output terminal of transmission gate 100 and negative power supply $V_{SS}$; input signals A and B are input to their gates, respectively.

The output terminal of transmission gate 100, the drain of transistor Q103 and the drain of transistor Q104 are directly connected to the input terminal of transmission gate 102 and are connected to the input terminal of transmission gate 104 via inverter INV102.

Carry in signal C, input from input terminal C, is directly input to the gate of transistor Q107 of transmission gate 102 and to the gate of transistor Q108 of transmission gate 104, and is input to the gate of transistor Q106 of transmission gate 102 via inverter INV103 and to the gate of transistor Q109 of transmission gate 104.

The output terminals of both transmission gates 102 and 104 are connected to output terminal $S_{out}$ via inverter INV104.

Next, the function of each structural element in sum signal calculation circuit 10 will be explained. Inverters INV101–INV104 invert and output the logic values of the signals input to them. Transistors Q100 and Q101 of transmission gate 100 are both on when the logic value of input signal A is 0; input signal B is passed (transmitted) and is input to sum signal generation circuit 14 from the output terminal. Conversely, transistors Q100 and Q101 of transmission gate 100 are off when the logic value of input signal A is 1; both the input and the output terminals will be in a high impedance state. Thus, in this case, the passage of input signal B to sum signal generation circuit 14 will be blocked.

When input signal A has a logical 0, transistors Q102–105 input the output signal from transmission gate 100 to sum signal generation circuit 14. When input signal A has a logical 1 and input signal B has a logical 1, voltage $V_{SS}$, that is, a logical 0, is input to sum signal generation circuit 14 as an addition signal. When input signal A has a logical 1 and input signal B has a logical 0, voltage $V_{DD}$, that is a logical 1, is input to sum signal generation circuit 14 as an addition signal.

Both transistors Q106 and Q107 of transmission gate 102 are on when the logic value of carry in signal C is 1, so that input signal B that transmission gate 100 has allowed to pass and a logical 1 or a logical 0 selected by transistors Q102–Q105, that is, addition signals, are passed and input to inverter INV104. Conversely, when the logic value of carry in signal C is 0, transistors Q106 and Q107 of transmission gate 102 will be off. Thus, in this case, passage of the addition signal via transmission gate 102 to inverter INV104 is blocked.

When the logic value of carry in signal C is 0, both transistors Q108 and Q109 of transmission gate 104 will be on, so that a complemented addition signal will be passed and input to inverter INV104. Conversely, when the logic value of carry in signal C is 1, transistors Q108 and Q109 will both be off and the passage of a complemented addition signal to inverter INV104 will be blocked.

In short, transmission gates 102 and 104 select an addition signal or a complemented addition signal in accordance with the value of carry in signal C and input it to inverter INV104.

Next, the circuit connections and functions of carry signal calculation circuit 16 will be explained, with references to FIG. 1(B).

The connections of transistors Q121–Q132 in carry signal calculation circuit 16 and of inverter INV121 are as described below. Transistors Q121–Q124, transistors Q125–Q128, and transistors Q129–Q132 are each connected in series between positive power supply $V_{DD}$ and negative power supply $V_{SS}$. The drain of transistor Q122 and the drain of transistor Q123, the drain of transistor Q126 and the drain of transistor Q127, and the drain of transistor Q130, the drain of transistor Q131 and the input terminal of inverter INV121 are connected.

Also, signals input to the gates of transistors Q121–Q132 are as described below.

Input signal A is input to the gate of transistor Q121, input signal B is input to the gate of transistor Q122, input signal B is input to the gate of transistor Q123, input signal A is input to the gate of transistor Q124, carry in signal C is input to the gate of transistor Q125, input signal A is input to the gate of transistor Q126, input signal A is input to the gate of transistor Q127, carry in signal C is input to the gate of transistor Q128, input signal B is input to the gate of transistor Q129, carry in signal C is input to the gate of transistor Q130, carry in signal C is input to the gate of transistor Q131, and input signal B is input to the gate of transistor Q132.

Only when the logic values of input signals A and B and carry in signal C are (1, 0, 1), (0, 1, 1), (1, 1, 0), or (1, 1, 1), carry signal calculation circuit 16, because of the circuit connections above, will output a logical 1 for carry out signal $C_{out}$. In other cases it will output a logical 0.

Note that of the structural elements of full adder 1 as discussed above, transmission gate 100 corresponds to the first signal passing means pertaining to the present invention, transistors Q102–Q105 and inverter INV101 correspond to the first signal selection means pertaining to the present invention, sum signal generation circuit 14 corresponds to the sum signal generation means pertaining to the present invention, and carry signal calculation circuit 16 corresponds to the carry generation means pertaining to the present invention.

Below, the operation of full adder 1 for each combination of input signals A and B and carry in signal C will be explained. First, the operation of full adder 1 when the logic values of input signals A and B and carry signal C are all 0 (recorded as (0, 0, 0) hereafter), will be explained.

In addition signal generation circuit 12, since the logic value of input signal A is 0, transistors Q100 and Q101 of transmission gate 100 will be on and input signal B will pass. Transistors Q103 and Q104 will be off and input signal B (logical 0) will be input to sum signal generation circuit 14 as an addition signal.

In sum signal generation circuit 14, since the logic value of carry in signal C is 0, transmission gate 104 will pass a signal where the logic value of the addition signal (input signal B=logical 0) is complemented (logical 1), the logic value of this signal will be additionally complemented by inverter INV104 and a logical 0 will be output as sum signal $S_{out}$.

In carry signal calculation circuit 16, transistors Q121, Q122, Q125, Q126, Q129 and Q130 will be on, a logical 1 (voltage $V_{DD}$) will be input to inverter INV121, and this logic value will be complemented by inverter INV121 and a logical 0 will be output as carry out signal $C_{out}$.

Next, the operation of full adder 1 when the combination of input signals A and B and carry in signal C is (1, 0, 0) will be explained.

In addition signal generation circuit 12, since the logic value of input signal A is 1, transistors Q100 and Q101 of transmission gate 100 will be off, input signal B will be blocked, and transistors Q103 and Q104 will be off. Furthermore, the logic value of input signal B is 0, so that transistor Q102 will be on, and logical 1 (voltage $V_{DD}$) will be input to sum signal generation circuit 14 as an addition signal.

In sum signal generation circuit 14, since the logic value of carry in signal C is 0, transmission gate 104 will pass a signal where the logic value of the addition signal (logical 1) is complemented (logical 0), the logic value of this signal will be additionally complemented by inverter INV104 and a logical 1 will be output as sum signal $S_{out}$.

In carry signal calculation circuit 16, transistors Q122, Q124, Q125, Q127, Q129 and Q130 will be on, and the other transistors will be off. Therefore, a logical 1 (voltage $V_{DD}$) will be input to inverter INV121, this logic value will be complemented by inverter INV121 and a logical 0 will be output as carry out signal $C_{out}$.

Next, the operation of full adder 1 when the combination of input signals A and B and carry in signal C is (0, 1, 0) will be explained.

In addition signal generation circuit 12, since the logic value of input signal A is 0, transistors Q100 and Q101 of transmission gate 100 will be on, input signal B will be passed. Transistors Q103 and Q104 will be off and input signal B (logical 1) will be input to sum signal generation circuit 14 as an addition signal.

In sum signal generation circuit 14, since the logic value of carry in signal C is 0, transmission gate 104 will pass a signal where the logic value of the addition signal (logical 1) is complemented logical 0), the logic value of this signal will also be complemented by inverter INV104 and a logical 1 will be output as sum signal $S_{out}$.

In carry signal calculation circuit 16, transistors Q121, Q123, Q125, Q126, Q130 and Q132 will be on, and the other transistors will be off. Therefore, a logical 1 (voltage $V_{DD}$) Will be input to inverter INV121, this logic value will be complemented by inverter INV121 and a logical 0 will be output as carry out signal $C_{out}$.

Next, the operation of full adder 1 when the combination of input signals A and B and carry in signal C is (0, 0, 1) will be explained.

In addition signal generation circuit 12, since the logic value of input signal A is 0, transistors Q100 and Q101 of transmission gate 100 will be on and input signal B will be passed. Transistors Q103 and Q104 will be off and input signal B (logical 0) will be input to sum signal generation circuit 14 as an addition signal.

In sum signal generation circuit 14, since the logic value of carry in signal C is 1, transmission gate 102 will pass the addition signal (logical 0), the logic value of this signal will be complemented by inverter INV104 and a logical 1 will be output as sum signal $S_{out}$.

In carry signal calculation circuit 16, transistors Q121, Q122, Q126, Q128, Q129 and Q131 will be on, and the other transistors will be off. Therefore, a logical 1 (voltage $V_{DD}$) will be input to inverter INV121, this logic value will be complemented by inverter INV121 and a logical 0 will be output as carry out signal $C_{out}$.

Next, the operation of full adder 1 when the combination of input signals A and B and carry in signal C is (1, 0, 1) will be explained.

In addition signal generation circuit 12, since the logic value of input signal A is 1, transistors Q100 and Q101 of transmission gate 100 will be off, input signal B will be blocked, and transistors Q103 and Q104 will be on. And since the logic value of input signal B is 0, transistor Q102 will be on and a logical 1 (voltage $V_{DD}$) will be input to sum signal generation circuit 14 as an addition signal.

In sum signal generation circuit 14, since the logic value of carry in signal C is 1, transmission gate 102 will pass the addition signal (logical 1), the logic value of this signal will be complemented by inverter INV104, and a logical 0 will be output as sum signal $S_{out}$.

In carry signal calculation circuit 16, transistors Q122, Q124, Q127, Q128, Q129 and Q131 will be on, and the other transistors will be off. Therefore, a logical 0 (voltage $V_{SS}$) will be input to inverter INV121, this logic value will be complemented by inverter INV121, and a logical 0 will be output as carry out signal $C_{out}$.

Next, the operation of full adder 1 when the combination of input signals A and B and carry in signal C is (1, 1, 0) will be explained.

In addition signal generation circuit 12, since the logic value of input signal A is 1, transistors Q100 and Q101 of transmission gate 100 will be off, input signal B will be blocked, and transistors Q103 and Q104 will be on. And since the logic value of input signal B is 1, transistor Q105 will be on and a logical 0 (voltage $V_{SS}$) will be input to sum signal generation circuit 14 as an addition signal.

In sum signal generation circuit 14, since the logic value of carry in signal C is 0, transmission gate 104 will pass the addition signal (logical 1) with its logic value complemented, the logic value of this signal will also be complemented by inverter INV104, and a logical 0 will be output as sum signal $S_{out}$.

In carry signal calculation circuit 16, transistors Q123, Q124, Q125, Q127, Q130 and Q132 will be on, and the other transistors will be off. Therefore, a logical 0 (voltage $V_{SS}$) will be input to inverter INV121, this logic value will be complemented by inverter INV121, and a logical 1 will be output as carry out signal $C_{out}$.

Next, the operation of full adder 1 when the combination of input signals A and B and carry in signal C is (0, 1, 1) will be explained.

In addition signal generation circuit 12, since the logic value of input signal A is 0, transistors Q100 and Q101 of transmission gate 100 will be on, input signal B will be passed, and transistors Q103 and Q104 will be off. Thus, the input signal (logical 1) will be input to sum signal generation circuit 14 as an addition signal.

In sum signal generation circuit 14, since the logic value of carry in signal C is 1, transmission gate 102 will pass the addition signal (logical 1), the logic value of this signal will be complemented by inverter INV104, and a logical 0 will be output as sum signal $S_{out}$.

In carry signal calculation circuit 16, transistors Q121, Q123, Q126, Q128, Q131 and Q132 will be on, and the other transistors will be off. Therefore, a logical 0 (voltage $V_{SS}$) will be input to inverter INV121, this logic value will be complemented by inverter INV121, and a logical 1 will be output as carry out signal $C_{out}$.

Next, the operation of full adder 1 when the combination of input signals A and B and carry in signal C is (1, 1, 1) will be explained.

In addition signal generation circuit 12, since the logic value of input signal A is 1, transistors Q100 and Q101 of transmission gate 100 will be off, input signal B will be blocked, and transistors Q103 and Q104 will be on. And since the logic value of input signal B is 1, transistor Q105 will be on and a logical 0 (voltage $V_{SS}$) will be input to sum signal generation circuit 14 as an addition signal.

In sum signal generation circuit 14, since the logic value of carry in signal C is 1, transmission gate 102 will pass the addition signal (logical 0), the logic value of this signal will be complemented by inverter INV104, and a logical 1 will be output as sum signal $S_{out}$.

In carry signal calculation circuit 16, transistors Q123, Q124, Q127, Q128, Q131 and Q132 will be on, and the other transistors will be off. Therefore, a logical 0 (voltage $V_{SS}$) will be input to inverter INV121, this logic value will be complemented by inverter INV121, and a logical 1 will be output as carry out signal $C_{out}$.

As explained above, full adder 1 performs addition for 3 input signals and calculates sum signal $S_{out}$ and carry out signal $C_{out}$.

In full adder 1, the number of transistor gate stages through which the signals pass, unaided by any logic circuits, will be no more than two, making the large transistors used to impart higher speed to the operation of full adder 8, shown as an example of the prior art, unnecessary. Thus, as will be discussed below in Application Example 2, the area that full adder 1 occupies on a semiconductor element will be noticeably smaller than with full adder 8.

Also, in full adder 1, since only a NOT gate is used as the logic circuit, the delay in the logic circuit is very small. Thus, full adder 1 can perform rapid full addition operations.

Also, since the circuit construction is such that sum signal calculation circuit 10 and carry signal calculation circuit 16 are almost completely independent, as will be discussed below with references to FIG. 3, the worst case value for the operating speed will be improved over that of full adder 8, shown as an example of the prior art. That is, variation in the speed of processing for each input signal combination will be very small with full adder 1, and overall processing will be faster, in comparison to full adder 8.

Embodiment 2

A second embodiment of the present invention will be explained with reference to FIGS. 2A, 2B, and 3–4.

Figure 2A:
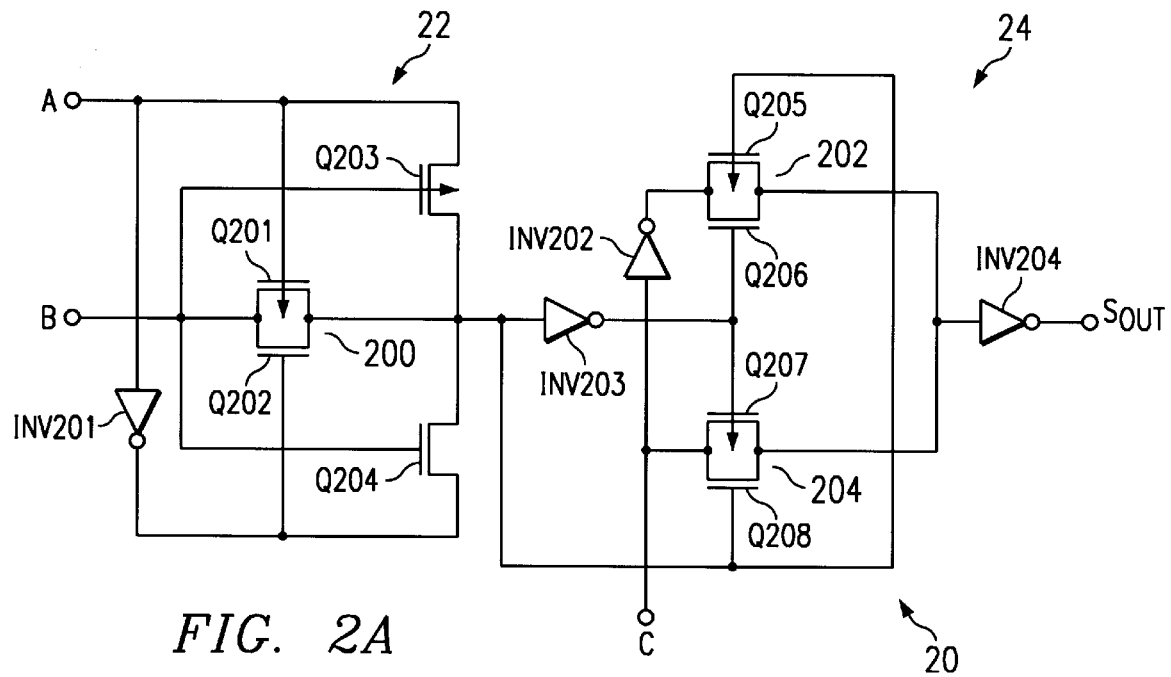
FIGS. 2A and 2B are schematics of a second embodiment of a full adder of the present invention. (A) shows the constitution of the sum signal calculation circuit, and (B) shows the constitution of a carry signal calculation circuit.
Figure 2B:
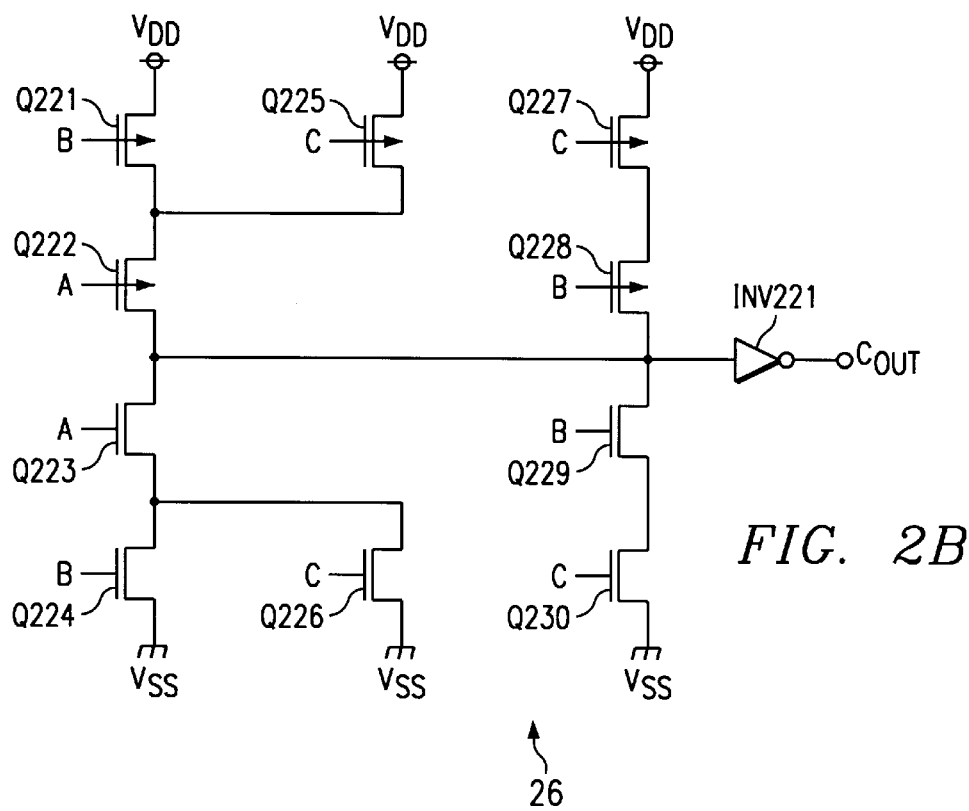

FIGS. 2A and 2B show a full adder 2 of the present invention. FIG. 2A shows a sum signal calculating circuit 20 and FIG. 2B shows a carry signal calculation circuit 26.

Figure 3:
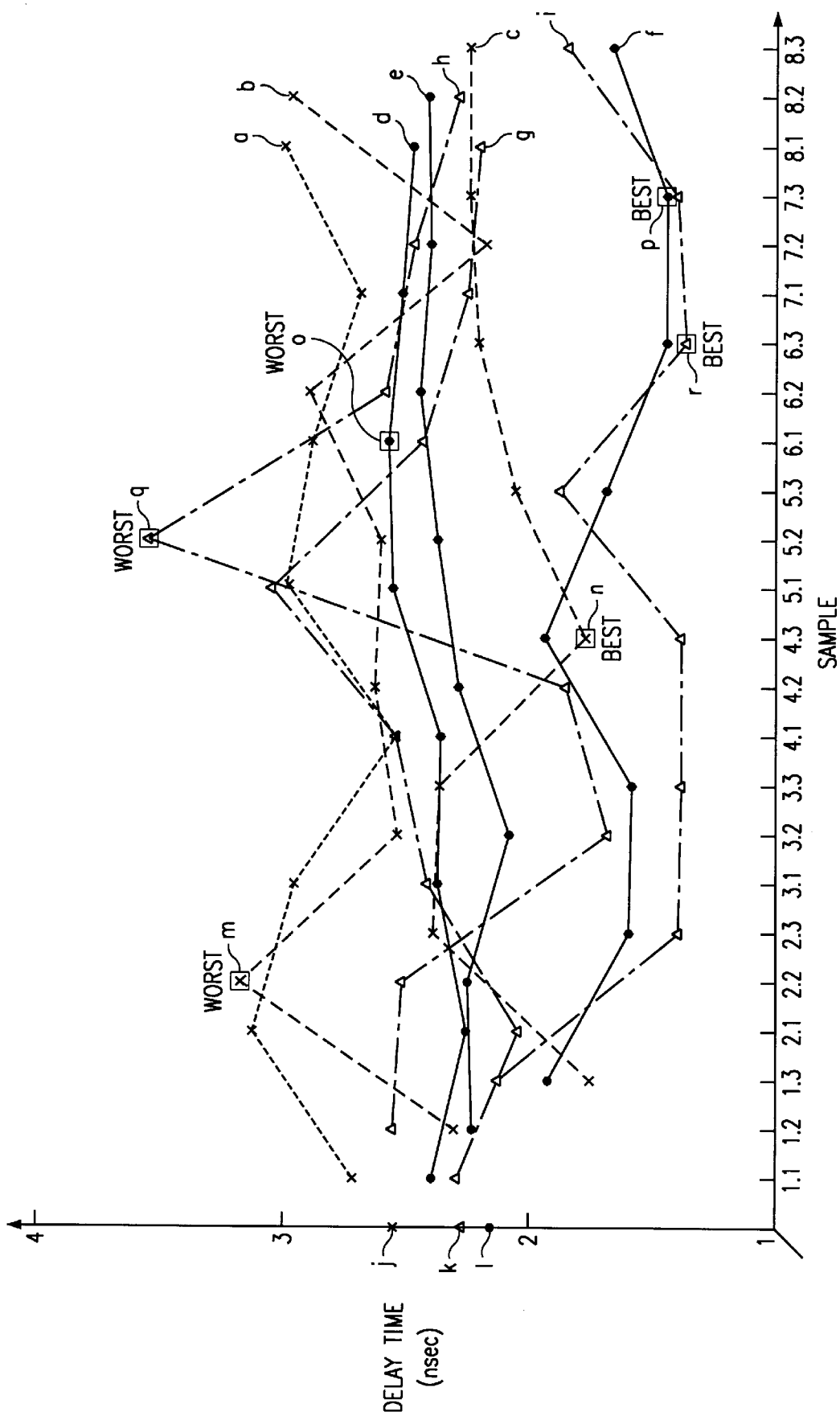
FIG. 3 shows, in graphical form, the operating speeds in sum signal calculation processing by the full adder of the present invention shown in FIGS. 1A and 1B, the full adder of the present invention shown in FIGS. 2A and 2B, and a full adder of the prior art, when compared in bench mark testing.

FIG. 3 shows, in graphical form, operating speeds in sum signal calculation processing compared by bench mark testing for full adder 1 of the present invention, shown in FIG. 1, full adder 2 of the present invention, shown in FIG. 2, and full adder 8, shown as an example of the prior art.

Figure 4:
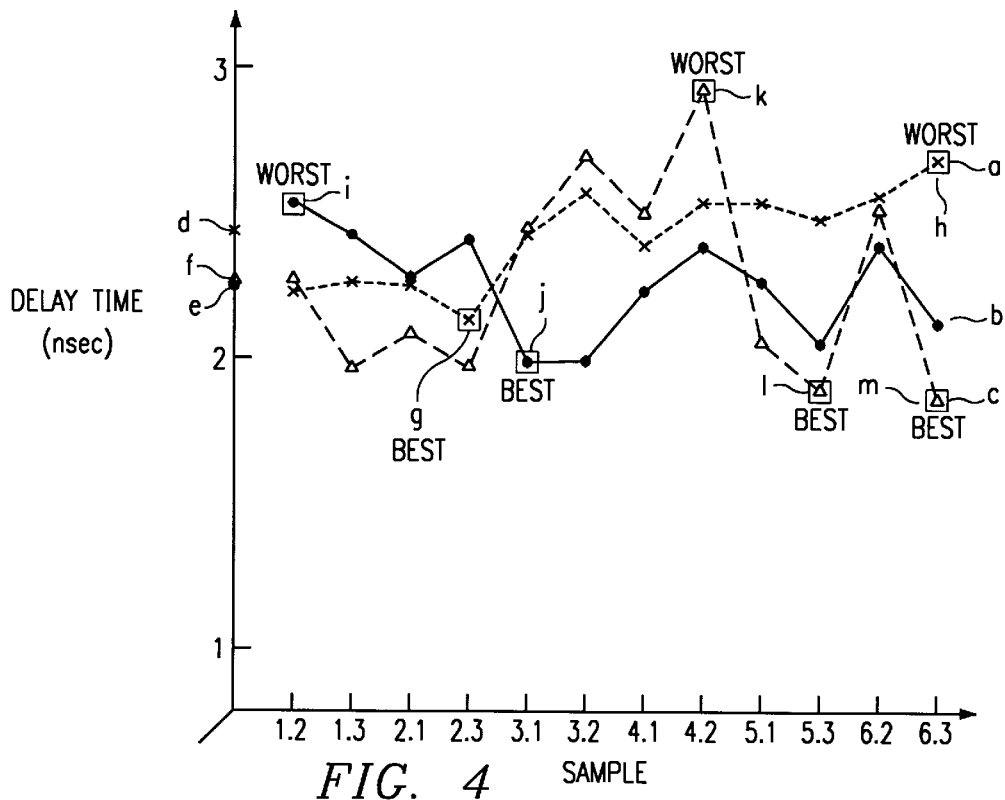
FIG. 4 shows, in graphical form, the operating speeds in carry out signal calculation processing by the full adder of the present invention shown in FIG. 1, the full adder of the present invention shown in FIG. 2, and a full adder of the prior art, when compared in bench mark testing.

FIG. 4 shows, in graphical form, operating speeds in carry out signal calculation processing compared by bench mark testing for full adder 1 of the present invention, shown in FIG. 1, full adder 2 of the present invention, shown in FIG. 2, and full adder 8, shown as an example of the prior art.

Full adder 2, shown in Application Example 2, has higher processing speed by improving sum signal calculation circuit 10 and carry signal calculation circuit 16 in full adder 1, shown in Application Example 1.

First, the constitution of full adder 2 will be explained with reference to FIG. 2.

In full adder 2, sum signal calculation circuit 20 corresponds to sum signal calculation circuit 12 in full adder 1, shown in Application Example 1. Addition signal generation circuit 22 of sum signal calculation circuit 20 corresponds to sum signal generation circuit 12 of full adder 1, sum signal generation circuit 24 of sum signal calculation circuit 20 corresponds to sum signal generation circuit 14 of full adder 1, and carry signal calculation circuit 26 corresponds to carry signal calculation circuit 16 of full adder 1.

Full adder 2 is composed of NMOS transistors Q202, Q204, Q206, Q208, Q223, Q224, Q226, Q229 and Q230, PMOS transistors Q201, Q203, Q205, Q207, Q221, Q222, Q225, Q227 and Q228, and inverters INV201–INV204 and INV221.

Of these transistors, transistors Q201 and Q202, transistors Q205 and Q206, and transistors Q207 and Q208 constitute transmission gates 200, 202 and 204, respectively.

And of these structural elements, transmission gate 200, inverter INV201 and transistors Q203 and Q204 constitute addition signal generation circuit 22. Transmission gates 202 and 204 and inverters INV202–204 constitute sum signal generation circuit 24. Transistors Q221–Q230 and inverter INV221 constitute carry signal calculation circuit 26.

First, the circuit connections of sum signal calculation circuit 20 will be explained, with reference to FIG. 2(A).

Input signal A (the first input signal), input via input 104 is input directly to the gate of transistor Q201 of transmission gate 200 and the drain of transistor Q203, and to the gate of transistor Q202 and the source of transistor Q204 via inverter INV201.

Input signal B (the second input signal), input via input terminal B, is input to the input terminal of transmission gate 200 and to the gates of transistors Q203 and Q204.

The source of transistor Q203 is connected to the output terminal of transmission gate 200, and input signal B is input to the gate of transistor Q203.

The drain of transistor Q204 is connected to the output terminal of transmission gate 200 and input signal B is input to the gate of transistor Q204.

The output terminal of transmission gate 200, the source of transistor Q203, and the drain of transistor Q204 are directly connected to the gates of transistor Q205 of transmission gate 202 and transistor Q208 of transmission gate 204, and are connected via inverter INV203 to the gates of transistor Q206 of transmission gate 202 and transistor Q207 of transmission gate 204.

Carry in signal C, input through input terminal C, is input to the input terminal of transmission gate 204, and is input to the input terminal of transmission gate 202 via inverter INV202.

The output terminals of transmission gates 202 and 204 are both connected to output terminal $S_{out}$ via inverter INV204.

Next, the function of each of the structural elements in sum signal calculation circuit 20 will be explained.

Inverters INV201–INV204 each complement and output the logic values of the signals input to them.

Both transistors Q201 and Q202 of transmission gate 200 are on when the logic value of input signal A is 0, and input signal B will be passed and output through the output terminal to sum signal generation circuit 24. Conversely, transistors Q201 and Q202 of transmission gate 200 will be off when the logic value of input signal A is 1, producing a high impedance at both the input and output terminals. Thus, in this case, passage of input signal B to sum signal generation circuit 24 will be blocked.

When the logic value of input signal B is 0, transistors Q203 and Q204 will pass input signal A and input it to sum signal generation circuit 24 as an addition signal. When the logic value of input signal B is 1, input signal A, with its logic value from inverter INV201, will pass and be input to sum signal generation circuit 24 as an addition signal.

When the logic value of the addition signal is 0, transistors Q205 and Q206 of transmission gate 202 will both be on. Therefore, carry in signal C, with its logic value complemented by inverter INV202, is passed and input to inverter INV204. Conversely, when the logic value of the addition signal is 1, transistors Q205 and Q206 of transmission gate 202 will be off. Thus, in this case, passage of carry in signal C, with its logic value complemented, to inverter INV204 will be blocked.

When the logic value of the addition signal is 1, transistors Q207 and Q208 of transmission gate 204 will both be on, so that carry in signal C will pass and be input to inverter INV204. Conversely, when the logic value of the addition signal is 0, transistors Q207 and Q208 of transmission gate 204 will both be off and passage of carry in signal C to inverter INV204 will be blocked.

In short, transmission gates 202 and 204 select carry in signal C, or a complemented carry in signal, according to the value of the addition signal and input this to inverter INV204.

Next, the circuit connections and function of carry signal calculation circuit 26 will be explained with reference to FIG. 2(B). Carry signal calculation circuit 26 optimizes carry signal calculation circuit 16 shown in Application Example 1, reducing the number of transistors by 2. Carry signal calculation circuit 16 and carry signal calculation circuit 26 perform the same operation.

The connections of transistors Q221–Q230 in carry signal calculation circuit 26, and inverter INV221, are as described below.

Transistors Q221–Q224 and transistors Q227–Q230 are each connected in series between positive power supply $V_{DD}$ and negative power supply $V_{SS}$. Transistor Q225 is connected between positive power supply $V_{DD}$ and the drain-source connection of transistor Q221 and transistor Q222. Transistor Q226 is connected between negative power supply $V_{SS}$ and the source-drain connection of transistor Q223 and transistor Q224. The drain of transistor Q222 and the drain of transistor Q223, and the drain of transistors Q228 and the drain of transistor Q229, and the input terminal of inverter INV221 are connected.

In addition, signals input to the gates of transistors Q221–Q230 are as described below.

Input signal B is input to the gate of transistor Q221, input signal A is input to the gate of transistors Q222, input signal A is input to the gate of transistor Q223, input signal B is input to the gate of transistors Q224, carry in signal C is input to the gate of transistors Q225, carry in signal C is input to the gate of transistors Q226, carry in signal C is input to the gate of transistor Q227, input signal B is input to the gate of transistor Q228, input signal B is input to the gate of transistor Q229, and carry in signal C is input to the gate of transistor Q230.

Due to the circuit connections above, carry signal calculation circuit 26 will output a logical 1 as carry out signal $C_{out}$ only when the combination of input signals A and B and carry in signal C is (1, 0, 1), (0, 1, 1), (1, 1, 0), and (1, 1, 1). In other cases, it will output a logical 0 as the carry out signal.

Next, the operation of full adder 2 for each combination of input signals A and B and carry in signal C will be explained.

First, the operation of full adder 2 when the logic values of input signals A and B and carry in signal C are (0, 0, 0) will be explained.

In addition signal generation circuit 22, since the logic value of input signal A is 0, transmission gate 200 will pass input signal B (logical 0). Also, since the logic value of B is 0, transistor Q203 will be on and transistor Q204 will be off. Thus, transistor Q203 will pass input signal A (logical 0). Since the logic values of both input signals A and B are 0, the addition signal will be a logical 0.

In sum signal generation circuit 24, since the logic value of the addition signal is 0, transmission gate 202 will pass a signal (logical 1) where the logic value of carry in signal C (logical 0) has been complemented. The logic value of this signal will also be complemented by inverter INV204 and a logical 0 will be output as sum signal $S_{out}$.

In carry signal calculation circuit 26, transistors Q221, Q222, Q225, Q227 and Q228 will be on, a logical 1 (voltage $V_{DD}$) will be input to inverter INV221, this logic value will be complemented by inverter INV221, and a logical 0 will be output as carry out signal $C_{out}$.

Next, the operation of full adder 2 when the logic values of input signals A and B and carry in signal C are (1, 0, 0) will be explained.

In addition signal generation circuit 22, since the logic value of input signal A is 1, transistors Q201 and Q202 of transmission gate 200 will be off and input signal B will be blocked. Also, since the logic value of B is 0, transistor Q203 will be on and transistor Q204 will be off. Thus, transistor Q203 will pass input signal A (logical 1) and the addition signal will be a logical 1.

In sum signal generation circuit 24, since the logic value of the addition signal is 1, transmission gate 204 will pass carry in signal C (logical 0). The logic value of this signal will be additionally complemented by inverter INV204 and a logical 1 will be output as sum signal $S_{out}$.

In carry signal calculation circuit 26, transistors Q221, Q223, Q225, Q227 and Q228 will be on, a logical 1 (voltage $V_{DD}$) will be input to inverter INV221, this logic value will be complemented by inverter INV221, and a logical 0 will be output as carry out signal $C_{out}$.

Next, the operation of full adder 2 when the logic values of input signals A and B and carry in signal C are (0, 1, 0) will be explained.

In addition signal generation circuit 22, since the logic value of input signal A is 0, transistors Q201 and Q202 of transmission gate 200 will be on and input signal B will be passed. Also, since the logic value of B is 1, transistor Q204 will be on and transistor Q203 will be off. Thus, transistor Q204 will pass input signal A with its logic value complemented (logical 1). The logic values of both complemented input signal A and input signal B are 1, so that the addition signal will be a logical 1.

In sum signal generation circuit 24, since the logic value of the addition signal is 1, transmission gate 204 will pass carry in signal C (logical 0). The logic value of this signal will be complemented by inverter INV204 and a logical 1 will be output as sum signal $S_{out}$.

In carry signal calculation circuit 26, transistors Q222, Q224, Q225, Q227 and Q229 will be on, a logical 1 (voltage $V_{DD}$) will be input to inverter INV221, this logic value will be complemented by inverter INV221, and a logical 0 will be output as carry out signal $C_{out}$.

Next, the operation of full adder 2 when the logic values of input signals A and B and carry in signal C are (0, 0, 1) will be explained.

In addition signal generation circuit 22, since the logic value of input signal A is 0, transistors Q201 and Q202 of transmission gate 200 will be on and input signal B will be passed. Also, since the logic value of B is 0, transistor Q203 will be on and transistor Q204 will be off. Thus, transistor Q203 will pass input signal A (logical 0) and the addition signal will be a logical 0.

In sum signal generation circuit 24, since the logic value of the addition signal is 0, transmission gate 202 will pass carry in signal C (logical 0) with its logic value complemented. The logic value of this signal will also be complemented by inverter INV204 and a logical 1 will be output as sum signal $S_{out}$.

In carry signal calculation circuit 26, transistors Q221, Q222, Q226, Q228 and Q230 will be on, a logical 1 (voltage $V_{DD}$) will be input to inverter INV221, this logic value will be complemented by inverter INV221, and a logical 0 will be output as carry out signal $C_{out}$.

Next, the operation of full adder 2 when the logic values of input signals A and B and carry in signal C are (1, 0, 1) will be explained.

In addition signal generation circuit 22, since the logic value of input signal A is 1, transistors Q201 and Q202 of transmission gate 200 will be off and input signal B will be blocked. Also, since the logic value of B is 0, transistor Q203 will be on and transistor Q204 will be off. Thus, transistor Q203 will pass input signal A (logical 1) and the addition signal will be a logical 1.

In sum signal generation circuit 24, since the logic value of the addition signal is 1, transmission gate 204 will pass carry in signal C (logical 1). The logic value of this signal will be complemented by inverter INV204 and a logical 0 will be output as sum signal $S_{out}$.

In carry signal calculation circuit 26, transistors Q221, Q223, Q226, Q228 and Q230 will be on, a logical 0 (voltage $V_{SS}$) will be input to inverter INV221, this logic value will be complemented by inverter INV221, and a logical 1 will be output as carry out signal $C_{out}$.

Next, the operation of full adder 2 when the logic values of input signals A and B and carry in signal C are (1, 1, 0) will be explained.

In addition signal generation circuit 22, since the logic value of input signal A is 1, transistors Q201 and Q202 of transmission gate 200 will be off and input signal B will be blocked. Also, since the logic value of B is 1, transistor Q203 will be off and transistor Q204 will be on. Thus, transistor Q204 will pass input signal A with its logic value complemented (logical 0), and the addition signal will be a logical 0.

In sum signal generation circuit 24, since the logic value of the addition signal is 1, transmission gate 204 will pass carry in signal C (logical 0). The logic value of this signal will be complemented by inverter INV204 and a logical 1 will be output as sum signal $S_{out}$.

In carry signal calculation circuit 26, transistors Q223, Q224, Q225, Q227 and Q229 will be on, a logical 0 (voltage $V_{SS}$) will be input to inverter INV221, this logic value will be complemented by inverter INV221, and a logical 1 will be output as carry out signal $C_{out}$.

Next, the operation of full adder 2 when the logic values of input signals A and B and carry in signal C are (0, 1, 1) will be explained.

In addition signal generation circuit 22, since the logic value of input signal A is 0, transistors Q201 and Q202 of transmission gate 200 will be on and input signal B will pass (logical 1). Also, since the logic value of B is 1, transistor Q203 will be off and transistor Q204 will be on. Thus, transistor Q204 will pass complemented input signal A (logical 1). The logic values of both complemented input signal A and input signal B are 1, so that the addition signal will be a logical 1.

In sum signal generation circuit 24, since the logic value of the addition signal is 1, transmission gate 204 will pass carry in signal C (logical 1). The logic value of this signal will be complemented by inverter INV204 and a logical 0 will be output as sum signal $S_{out}$.

In carry signal calculation circuit 26, transistors Q222, Q224, Q226, Q229 and Q230 will be on, a logical 0 (voltage $V_{SS}$) will be input to inverter INV221, this logic value will be complemented by inverter INV221, and a logical 1 will be output as carry out signal $C_{out}$.

Next, the operation of full adder 2 when the logic values of input signals A and B and carry in signal C are (1, 1, 1) will be explained.

In addition signal generation circuit 22, since the logic value of input signal A is 1, transistors Q201 and Q202 of transmission gate 200 will be off and input signal B will be blocked. Also, since the logic value of B is 1, transistor Q203 will be off and transistor Q204 will be on. Thus, transistor Q204 will pass complemented input signal A (logical 0), and the addition signal will be a logical 0.

In sum signal generation circuit 24, since the logic value of the addition signal is 0, transmission gate 202 will pass complemented carry in signal C (logical 0). The logic value of this signal will also be complemented by inverter INV204 and a logical 1 will be output as sum signal $S_{out}$.

In carry signal calculation circuit 26, transistors Q223, Q224, Q226, Q229 and Q230 will be on, a logical 0 (voltage $V_{SS}$) will be input to inverter INV221, this logic value will be complemented by inverter INV221, and a logical 1 will be output as carry out signal $C_{out}$.

As explained above, full adder 2 performs full addition for 3 input signals and calculates sum signal $S_{out}$ and carry out signal $C_{out}$.

Below the operating speed, and the areas occupied on a semiconductor element, will be compared for full adder 1 shown in embodiment 1, full adder 2 shown in embodiment 2, and full adder 8, shown as an example of the prior art, with reference to Tables I–III, FIG. 3, and FIG. 4.

The results of bench mark testing of the time from when the combination of each input signal is input until the corresponding sum signal $S_{out}$ is output, for full adder 1, shown in Application Example 1, full adder 2, shown in Application Example 2, and full adder 8, shown as an example of the prior art, is as shown in Table I.

TABLE I

| | A | B | C | FULL ADDER 2 | FULL ADDER 1 | FULL ADDER 8 |
|---|---|---|---|---|---|---|
| (1) | 0 | 0 | 0 | | | |
| 1-1 | 0 | 0 | 0 | 2.38 | 2.71 | 2.17 |
| 1-2 | 0 | 1→0 | 0 | 2.21 | 2.29 | 2.54 |
| 1-3 | 0 | 0 | 1→0 | 1.89 | 1.73 | 2.10 |
| (2) | 1 | 0 | 0 | | | |
| 2-1 | 0→1 | 0 | 0 | 2.42 | 3.12 | 2.02 |
| 2-2 | 1 | 1→0 | 0 | 2.30 | #3.18 | 2.51 |
| 2-3 | 1 | 0 | 1→0 | 1.57 | 2.37 | 1.38 |
| (3) | 0 | 1 | 0 | | | |
| 3-1 | 0→1 | 1 | 0 | 2.35 | 2.97 | 2.39 |
| 3-2 | 1 | 0→1 | 0 | 2.05 | 2.54 | 2.66 |
| 3-3 | 1 | 0 | 1→0 | 1.57 | 2.35 | 1.38 |
| (4) | 1 | 1 | 0 | | | |
| 4-1 | 0→1 | 1 | 0 | 2.35 | 2.53 | 2.54 |
| 4-2 | 1 | 0→1 | 0 | 2.27 | 2.63 | 2.83 |
| 4-3 | 1 | 1 | 1→0 | 1.90 | *1.72 | 2.11 |
| (5) | 0 | 0 | 1 | | | |
| 5-1 | 1→0 | 0 | 1 | 2.56 | 3.00 | 3.06 |
| 5-2 | 0 | 1→0 | 1 | 2.37 | 2.60 | #3.57 |
| 5-3 | 0 | 0 | 0→1 | 1.66 | 2.03 | 1.84 |
| (6) | 1 | 0 | 1 | | | |
| 6-1 | 0→1 | 0 | 1 | #2.58 | 2.89 | 2.43 |
| 6-2 | 1 | 1→0 | 1 | 2.45 | 2.90 | 2.60 |
| 6-3 | 1 | 0 | 0→1 | 1.43 | 2.19 | *1.36 |
| (7) | 0 | 1 | 1 | | | |
| 7-1 | 1→0 | 1 | 1 | 2.53 | 2.70 | 2.24 |
| 7-2 | 0 | 1→0 | 1 | 2.51 | 2.17 | 2.45 |
| 7-3 | 0 | 0 | 0→1 | *1.42 | 2.25 | 1.38 |
| (8) | 1 | 1 | 1 | | | |
| 8-1 | 0→1 | 1 | 1 | 2.49 | 3.03 | 2.20 |
| 8-2 | 1 | 0→1 | 1 | 2.42 | 3.00 | 2.30 |
| 8-3 | 1 | 1 | 0→1 | 1.65 | 2.25 | 1.83 |
| Average Value | | | | 2.139 | 2.543 | 2.245 |

In Table I, symbols 1-1 to 8-3 correspond to the symbols on the horizontal axis of FIG. 3. The logic values shown for symbols 1-1 to 8-3 indicate the logic values of input signals A and B and carry in signal C, and changes in the logic values. The logic values in columns (1)–(8) indicate the logic values after each input signal changes; # represents the worst value for each numerical value, and * represents the best value for each numerical value. The unit of time for each numerical value is ptimize.

FIG. 3 is a graphical representation of the numerical values of Table I.

In FIG. 3, among each of the numerical values for the same full adder shown in Table I, the numerical values included in symbols k–1, k–2, k–2 (k=1, 2, . . . , 8) in Table I that show the same tendencies are joined, making it easy to see variation in processing speed between each of the full adders.

That is, in FIG. 3, curve a represents the numerical values for full adder 1 indicated by symbol k–1 in Table I. Curve b represents the numerical values for full adder 1 indicated by symbol k–2 in Table I. Curve c represents the numerical values for full adder 1 indicated by symbol k–3 in Table I. Point n on curve c represents the best value for the speed with which full adder 1 calculates sum signal $S_{out}$. Point m on curve b represents the worst value for the speed with which full adder 1 calculates sum signal $S_{out}$.

Also, curve d represents the numerical values for full adder 2 indicated by symbol k–1 in Table I. Curve e represents the numerical values for full adder 2 indicated by symbol k–2 in Table I. Curve f represents the numerical values for full adder 2 indicated by symbol k–3 in Table I. Point p on curve f represents the best value for the speed with which full adder 2 calculates sum signal $S_{out}$. Point o on curve d represents the worst value for the speed with which full adder 2 calculates sum signal $S_{out}$.

Also, curve g represents the numerical values for full adder 8 indicated by symbol k–1 in Table I. Curve h represents the numerical values for full adder 8 indicated by symbol k–2 in Table I. Curve i represents the numerical values for full adder 8 indicated by symbol k–3 in Table I. Point q on curve h represents the best value for the speed with which full adder 8 calculates sum signal $S_{out}$. Point r on curve f represents the worst value for the speed with which full adder 8 calculates sum signal $S_{out}$.

The results of bench mark testing of the time from when the combination of each input signal is input until the corresponding carry out signal $C_{out}$ is output, for full adder 1, shown in Application Example 1, full adder 2, shown in Application Example 2, and full adder 8, shown as an example of the prior art, are as shown in Table II.

TABLE II

| | A | B | C | FULL ADDER 2 | FULL ADDER 1 | FULL ADDER 8 |
|---|---|---|---|---|---|---|
| (1) | 1 | 0 | 0 | | | |
| 1-2 | 1 | 1→0 | 0 | #2.53 | 2.23 | 2.27 |
| 1-3 | 1 | 0 | 1→0 | 2.43 | 2.26 | 1.97 |
| (2) | 0 | 1 | 0 | | | |
| 2-1 | 1→0 | 1 | 0 | 2.28 | 2.25 | 2..09 |
| 2-3 | 0 | 1 | 1→0 | 2.41 | *2.14 | 1.97 |
| (3) | 1 | 1 | 0 | | | |
| 3-1 | 0→1 | 1 | 0 | *1.99 | 2.39 | 2.45 |
| 3-2 | 1 | 0→1 | 0 | 2.00 | 2.57 | 2.70 |
| (4) | 0 | 0 | 1 | | | |
| 4-1 | 1→0 | 0 | 1 | 2.23 | 2.39 | 2.49 |
| 4-2 | 1 | 1→0 | 1 | 2.40 | 2.55 | #2.91 |
| (5) | 1 | 0 | 1 | | | |
| 5-1 | 0→1 | 0 | 0 | 2.29 | 2.55 | 2.10 |
| 5-3 | 1 | 1 | 0→1 | 2.06 | 2.49 | *1.89 |
| (6) | 0 | 1 | 1 | | | |
| 6-2 | 0 | 0→1 | 1 | 2.40 | 2.56 | 2.50 |
| 6-3 | 0 | 1 | 0→1 | 2.12 | #2.68 | *1.89 |
| Average Value | | | | 2.262 | 2.444 | 2.269 |

In Table II, symbols 1-2 to 6-3 correspond to the symbols on the horizontal axis in FIG. 4. The logic values indicated for symbols 1-2 to 6-3 represent the logic values of input signals A and B and carry in signal C, and changes in the logic values. The logic values in columns (1)–(6) indicate the logic values after each input signal changes. # is the worst value for each numerical value, * is the best value for each numerical value, and the unit of each numerical value is ptimize.

FIG. 4 has each of the numerical values in Table II graphed.

That is, in FIG. 4, curve a represents the numerical values for full adder 1 shown in Table II. Point g shown on curve a represents the best value for the speed at which full adder 1 calculates the carry signal. Point m shown on curve a represents the worst value for the processing speed of full adder 1.

Also, curve b represents the numerical values for full adder 2 shown in Table II. Point j shown on curve b represents the best value for the speed at which full adder 2 calculates the carry signal. Point i shown on curve b represents the worst value for the processing speed of full adder 2.

Also, curve c represents the numerical values for full adder 8 shown in Table II. Points l and m shown on curve c represent the best values for the speed at which full adder 8 calculates the carry signal. Point k shown on curve c represents the worst value for the processing speed of full adder 8.

The ratio of the areas shown on a semiconductor element for full adder 1, shown in Application Example 1, full adder 2, shown in Application Example 2, and full adder 8, shown as the prior art, will be as shown in Table III.

TABLE III

| FULL ADDER 2 | FULL ADDER 1 | FULL ADDER 8 |
|---|---|---|
| 0.93 | 0.79 | 1.00 |

Here, the numerical values in Table III are ratios for the areas of full adder 2 and full adder 1 when the area of full adder 8 is 1.00.

As can be seen by referring to Tables I–III, FIG. 3 and FIG. 4, the time required to calculate sum signal $S_{out}$ in full adder 8 is 3.57–1.36 nsec. In contrast to this, the time required to calculate sum signal $S_{out}$ in full adder 1 is 3.18–1.72 nsec, and the time required to calculate sum signal $S_{out}$ in full adder 2 is between 2.58–1.42 nsec. Also, the time required to calculate sum signal $S_{out}$ in full adder 8 is 2.91–1.89 nsec. In contrast to this, the time required to calculate sum signal $S_{out}$ in full adder 1 is 2.68–2.14 nsec, and the time required to calculated sum signal $S_{out}$ in full adder 2 is between 2.53–1.99 nsec.

There is less variation in the times needed to calculate sum signal $S_{out}$ and carry out signal $C_{out}$ in full adders 1 and 2 of the present invention. Also, the worst values for the times needed to calculate sum signal $S_{out}$ and carry out signal $C_{out}$ by full adder 1 and full adder 2 are both smaller than the worst value with full adder 8. The full adder operating cycle must normally be greater than the worst value for the time needed to calculate sum signal $S_{out}$ and carry out signal $C_{out}$, so full adders 1 and 2 will be able to process more rapidly than will full adder 8.

Also, the area that full adder 1 occupies on a semiconductor element is noticeably smaller than full adder 8. On the other hand, the area that full adder 2 occupies on a semiconductor element is not much smaller than full adder 8, but its operating cycle can be made shorter than that of full adder 8. Thus, the circuits can be used according to the purpose, i.e., for semiconductor element design whose major goal is higher integration, full adder 1 should be used, and for a semiconductor design whose major goal is higher speed, full adder 2 should be used.

Also, since the number of circuit stages that amplify the signals, such as transmission gates through which signals pertaining to the calculation of sum signal $S_{out}$ and carry out signal $C_{out}$ continually pass, is fewer than in full adder 8, full adders 1 and 2 have the advantage of fast operation even at low power supply voltage.

Embodiment 3

A third embodiment of the present invention will be explained, with reference to FIG. 5.

Figure 5:
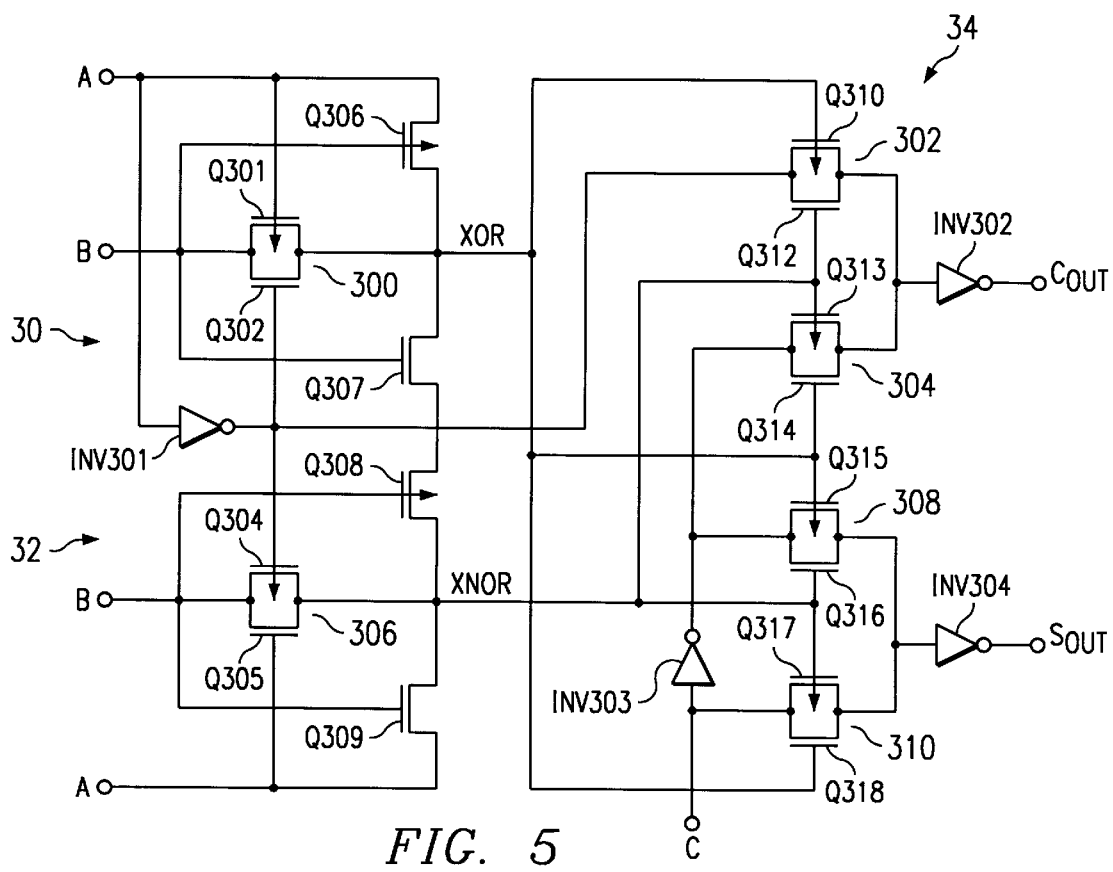
FIG. 5 shows a third embodiment of a full adder of the present invention.

FIG. 5 shows the constitution of full adder 3 of the present invention in Application Example 3.

Full adder 3 concentrates on making the best value for the calculation time of carry out signal $S_{out}$ [sic] much greater than the best value for the calculation time of sum signal $S_{out}$ in full adders 1 and 2, shown in the first and second application examples. It achieves higher speed for the calculation of carry out signal $S_{out}$ using practically the same circuit as that used for calculation of sum signal $S_{out}$ for calculation of carry out signal $S_{out}$ as well.

First, the constitution of full adder 3 will be explained.

Full adder 3 is composed of XOR gate 30, XNOR (exclusive inverse logic sum) gate 32, and carry signal/sum signal calculation circuit 34.

XOR gate 30 is composed of NMOS transistors Q302 and Q307, PMOS transistors Q301 and Q306, and inverter INV301. Of these transistors, transistors Q301 and Q302 constitute transmission gate 300.

XNOR gate 32 is composed of NMOS transistors Q305 and Q309 and PMOS transistors Q304 and Q308. Of these transistors, transistors Q304 and Q305 constitute transmission gate 306. That is, a structure is given so that the logic value of input signal A from XOR gate 30 is complemented.

Carry signal calculation circuit 34 is composed of NMOS transistors Q312, Q314, Q316 and Q308, PMOS transistors Q310, Q313, Q315 and Q317, and inverters INV302–INV304. Of these transistors, transistors Q310 and Q312, transistors Q313 and Q314, transistors Q315 and Q316, and transistors Q317 and Q318 constitute transmission gates 302, 304, 308, and 310, respectively.

Complemented input signal A, is input to input terminal of transmission gate 302. At the same time, carry in signal C, with its logic value complemented by inverter INV303, is input to the input terminals of transmission gates 304 and 308, and carry in signal C is input to the input terminal of transmission gate 310.

The input terminal of inverter 302 is connected to the output terminals of transmission gates 302 and 304. The logic values of signals selected by transmission gates 302 and 304 are complemented by inverter INV302 and these are output as carry out signal $C_{out}$.

Signal XOR is input to the gates of transistor Q310 of transmission gate 302, transistor Q314 of transmission gate 304, transistor Q315 of transmission gate 308, and transistor Q318 of transmission gate 310. Signal XNOR is input to the gates of transistor Q312 of transmission gate 302, transistor Q313 of transmission gate 304, transistor Q316 of transmission gate 308, and transistor Q317 of transmission gate 310.

The input terminal of inverter INV304 is connected to the output terminals of transmission gates 308 and 310. The logic values of signals selected by transmission gates 308 and 310 are complemented by inverter INV304 and output as sum signal $S_{out}$.

Next, the functions of XOR gate 30, XNOR gate 32 and carry signal/sum signal calculation circuit 34 of full adder 3 will be explained.

XOR gate 30 operates the same as sum signal calculation circuit 20 of full adder 2. That is, it performs the XOR for processing input signals A and B and inputs the results of the XOR processing as signal XOR to carry signal/sum signal calculation circuit 34, and inputs input signal A, with its logic value complemented by inverter INV301, to carry signal/sum signal calculation circuit 34 and to XNOR gate 32.

XNOR gate 32 performs XNOR processing for input signals A and B. The results are input to carry signal/sum signal calculation circuit 34 as signal XNOR. That is, signal XOR is the same as the addition signal in full adders 1 and 2, shown in the first and second application examples. Signal XNOR is the same as a signal with the logic value of the addition signal complemented in full adders 1 and 2.

When the logic value of signal XOR is 0 (the logic value of signal XNOR is 1), carry signal/sum signal calculation circuit 34 selects input signal A, with its logic value complemented, as carry out signal $C_{out}$ and the logic value is further complemented by inverter INV302 and output. Carry in signal C, with its logic value complemented, is selected as sum signal $S_{out}$ and the logic value is further complemented by inverter INV304 and output.

When the logic value of signal XOR is 1 (the logic value of signal XNOR is 0), carry signal/sum signal calculation circuit 34 selects carry in signal C, with its logic value complemented, as carry out signal $C_{out}$, and its logic value is further complemented by inverter INV302 and output. Carry in signal C is selected as sum signal $S_{out}$, and its logic value is further complemented by inverter INV304 and output.

Below, the operation of full adder 3 for each combination of logic values for signal XOR and carry in signal C will be explained, with emphasis on the operation of carry signal/sum signal calculation circuit 34.

First, the operation of full adder 3 when the combination of the logic values of signal XOR and carry in signal C is (0, 0), that is, when the combination of the logic values of input signals A and B and carry in signal C is (0, 0, 0) and (1, 1, 0), will be explained.

In this case, the logic value of signal XOR is 0, so transmission gate 302 of carry signal/sum signal calculation circuit 34 will be on, and transmission gate 304 will be off. Thus, transmission gate 302 will pass input signal A, with its logic value complemented. Input signal A, with its logic value complemented, that is passed by transmission gate 302 has its logic value additionally complemented by inverter INV302 and this is output as carry out signal $C_{out}$. That is, when the combination of the logic values of input signals A and B and carry in signal C is (0, 0, 0), a logical will be output as carry out signal $C_{out}$, and when it is (1, 1, 0), a logical 1 will be output as carry out signal $C_{out}$.

On the other hand, transmission gate 308 of carry signal/sum signal calculation circuit 34 will be on, and transmission gate 310 will be off. Thus, transmission gate 308 will pass carry in signal C with its logic value complemented (logical 1). Carry in signal C, with its logic value complemented, that is passed by transmission gate 308 has its logic value further complemented by logic value inverter INV304 and a logical 0 is output as carry out signal $C_{out}$.

Next, the operation of full adder 3 when the combination of the logic values of signal XOR and carry in signal C is (1, 0), that is, when the combination of the logic values of input signals A and B and carry in signal C is (1, 0, 0) and (0, 1, 0), will be explained.

In this case, the logic value of signal XOR is 1, so transmission gate 302 of carry signal/sum signal calculation circuit 34 will be off, and transmission gate 304 will be on. Thus, transmission gate 304 will pass carry in signal C with its logic value complemented (logical 1). Carry in signal C, with its logic value complemented, which is passed by transmission gate 304, has its logic value additionally complemented by inverter INV302 and a logical 0 is output as carry out signal $S_{out}$.

On the other hand, transmission gate 308 of carry signal/sum signal calculation circuit 34 will be off, and transmission gate 310 will be on. Thus, transmission gate 310 will pass carry in signal C (logical 0). Carry in signal C, that is passed by transmission gate 302, has its logic value 30 additionally complemented by logic value inverting circuit INV304 and a logical 1 is output as sum signal $S_{out}$.

Next, the operation of full adder 3 when the combination of the logic values of signal XOR and carry in signal C is (0, 1), that is, when the combination of the logic values of input signals A and B and carry in signal C is (0, 0, 1) and (1, 1, 1), will be explained.

In this case, the logic value of signal XOR is 0, so transmission gate 302 of carry signal/sum signal calculation circuit 34 will be on, and transmission gate 304 will be off. Thus, transmission gate 302 will pass input signal A with its logic value complemented. Input signal A, with its logic value complemented, which is passed by transmission gate 302, has its logic value additionally complemented by inverter INV302 and this is output as carry out signal $C_{out}$. that is, when the combination of the logic values of input signals A and B and carry in signal C is (0, 0, 1), a logical will be output as carry out signal $C_{out}$, and when it is (1, 1, 1), a logical 1 will be output as carry out signal $C_{out}$.

On the other hand, transmission gate 308 of carry signal/sum signal calculation circuit 34 will be on, and transmission gate 310 will be off. Thus, transmission gate 308 will pass carry in signal C, with its logic value complemented (logical 0). Carry in signal C, with its logic value complemented, which is passed by transmission gate 302, has its logic value additionally complemented by logic value inverter INV304 and a logical 1 is output as sum signal $S_{out}$.

Next, the operation of full adder 3 when the combination of the logic values of signal XOR and carry in signal C is (1, 1), that is, when the combination of the logic values of input signals A and B and carry in signal C is (1, 0, 1) and (0, 1, 1), will be explained.

In this case, the logic value of signal XOR will be 1, so transmission gate 302 of carry signal/sum signal calculation circuit 34 will be off, and transmission gate 304 will be on. Thus, transmission gate 304 will pass carry in signal C with its logic value complemented (logical 0). Carry in signal C, with its logic value complemented, that is passed by transmission gate 304, has its logic value additionally complemented by inverter INV302 and a logical 1 is output as carry out signal $C_{out}$.

On the other hand, transmission gate 308 of carry signal/sum signal calculation circuit 34 will be off, and transmission gate 310 will be on. Thus, transmission gate 310 will pass carry in signal C (logical 0). Carry in signal C, that is passed by transmission gate 302, has its logic value additionally complemented by logic value inverter INV304 and a logical 0 is output as sum signal $S_{out}$.

As stated above, the parts that calculate carry out signal $C_{out}$ and sum signal $S_{out}$ are separated in full adder 3, just as in full adders 1 and 2, so rapid full addition can be performed.

Also, since a circuit like sum signal generation circuits 14 and 24 of full adders 1 and 2 are used for calculating carry out signal $C_{out}$ in full adder 3 as well, the calculation of carry out signal $C_{out}$ can be carried out more rapidly.

Embodiment 4

A fourth embodiment of the present invention will be explained, with reference to FIG. 6.

Figure 6:
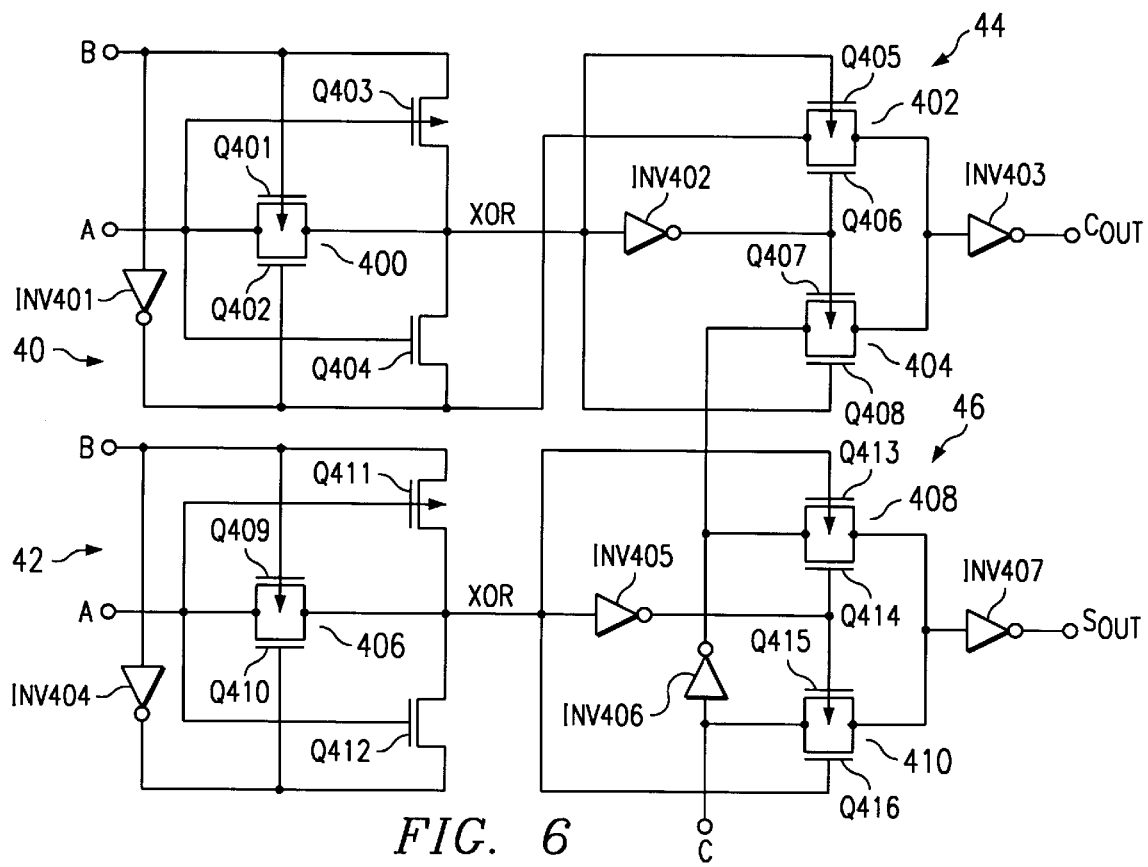
FIG. 6 shows a fourth embodiment of a full adder of the present invention.

FIG. 6 shows the constitution of full adder 4 of the present invention in Application Example 4.

Full adder 4 is a modification example of full adder 3 shown in Application Example 3.

First, the constitution of full adder 4 will be explained.

Full adder 4 is composed of XOR gates 40 and 42, carry signal calculation circuit 44, and sum signal calculation circuit 46.

XOR gate 40 is composed of NMOS transistors Q402 and Q404, PMOS transistors Q401 and Q403, and inverter INV401. Of these transistors, transistors Q401 and Q402 constitute transmission gate 400. XOR gate 40 has nearly the same constitution as addition signal generation circuit 22 of full adder 2, shown in Application Example 2, except that input signals A and B are switched.

XOR gate 42 is composed of NMOS transistors Q410 and Q412, PMOS transistors Q409 and Q411, and inverter INV404. Of these transistors, transistors Q409 and Q410 constitute transmission gate 406. XOR gate 42 has nearly the same constitution as addition signal generation circuit 22 of full adder 2, shown in the second application example, except that input signals A and B are switched.

Carry signal calculation circuit 44 is composed of NMOS transistors Q406 and Q408, PMOS transistors Q405 and Q407, and inverters INV402 and INV403. Of these transistors, transistors Q405 and Q406, and transistors Q407 and Q408 constitute transmission gates 402 and 404, respectively.

Input signal B, with its logic value complemented by inverter INV401, is input to the input terminal of transmission gate 402. At the same time, carry in signal C, with its logic value complemented by inverter INV406, is input to the input terminal of transmission gate 404.

Signal XOR from XOR gate 40 is input to the gates of transistor Q405 of transmission gate 402 and transistor Q408 of transmission gate 404. Signal XOR, with its logic value complemented by inverter INV402, is input to the gates of transistor Q406 of transmission gate 402 and transistor Q407 of transmission gate 404.

The input terminal of inverter INV403 is connected to the output terminals of transmission gates 402 and 404. Signals selected by transmission gates 402 and 404 have their logic values complemented by inverter INV403 and are output as carry out signal $C_{out}$.

Carry signal calculation circuit 46 is composed of NMOS transistors Q414 and Q416, PMOS transistors Q413 and Q415, and inverters INV405–INV407. Of these transistors, transistors Q413 and Q414, and transistors Q415 and Q416 constitute transmission gates 408 and 410, respectively.

Carry in signal C, with its logic value complemented by inverter INV406, is input to the input terminal of transmission gate 408. At the same time, carry in signal C is input to the input terminal of transmission gate 410.

Signal XOR from XOR gate 42 is input to the gates of transistor Q413 of transmission gate 408 and transistor Q416 of transmission gate 410. Signal XOR, with its logic value complemented by inverter INV405, is input to the gates of transistor Q414 of transmission gate 408 and transistor Q415 of transmission gate 410.

The input terminal of inverter INV407 is connected to the output terminals of transmission gates 408 and 410. Signals selected by transmission gates 408 and 410 have their logic values complemented by inverter INV407 and are output as sum signal $S_{out}$.

Next, the functions of XOR gates 40 and 42, carry signal calculation circuit 44, and sum signal calculation circuit 46 of full adder 4 will each be explained. XOR gate 40 operates the same as sum signal calculation circuit 20 of full adder 2. That is, it performs the XOR processing for input signals A and B and inputs to carry signal calculation circuit 44 the results of this XOR processing as signal XOR and the logic value of input signal B complemented by inverter INV401.

XOR gate 42 operates the same as sum signal calculation circuit 20 of full adder 2. That is, it performs the XOR processing for input signals A and B and inputs the results of this XOR operation to sum signal calculation circuit 46 as signal XOR. Note that the XOR signals that XOR gates 40 and 42 produce are the same as the addition signals in full adders 1 and 2 shown in Application Examples 1 and 2.

When the logic value of the XOR signal is 0, carry signal calculation circuit 44 selects input signal B, with its logic value complemented, as carry out signal $C_{out}$, and the logic value is additionally complemented by inverter INV403 and output. Also, when the logic value of the XOR signal is 1, carry signal calculation circuit 44 selects carry in signal C, with its logic value complemented, as carry out signal $C_{out}$, and the logic value is additionally complemented by inverter INV403 and output.

When the logic value of the XOR signal is 0, sum signal calculation circuit 46 selects carry in signal C, with its logic value complemented, as carry out signal $C_{out}$, and the logic value is further complemented by inverter INV407 and output. When the logic value of the XOR signal is 1, sum signal calculation circuit 46 selects carry in signal C as carry out signal $C_{out}$, and the logic value is additionally complemented by inverter INV407 and output.

Next, the operation of full adder 4 for each combination of logic values for signal XOR and carry in signal C will be explained, with emphasis on the operation of carry signal calculation circuit 44 and sum signal calculation circuit 46.

First, the operation of full adder 4 when the combination of the logic values of signal XOR and carry in signal C is (0, 0), that is, when the combination of the logic values of input signals A and B and carry in signal C is (0, 0, 0) and (1, 1, 0) will be explained.

In this case, since the logic value of signal XOR is 0, transmission gate 402 of carry signal calculation circuit 44 will be on, and transmission gate 404 will be off. Thus, transmission gate 402 will pass complemented input signal B. Complemented input signal B, which is passed by transmission gate 402 is also complemented, by inverter INV403 and output as carry out signal $C_{out}$. That is, when the combination of the logic values of input signals A and B and carry in signal C is (0, 0, 0), a logical 0 will be output as carry out signal $C_{out}$, and when it is (1, 1, 0), a logical 1 will be output as carry out signal $C_{out}$.

At the same time, transmission gate 408 of sum signal calculation circuit 46 will be on, and transmission gate 410 will be off. Thus, transmission gate 408 will pass complemented carry in signal C (logical 1). Complemented carry in signal C, which is passed by transmission gate 408, is also complemented by inverter INV407 and a logical 0 is output as sum signal $S_{out}$.

Next, the operation of full adder 4 when the combination of the logic values of signal XOR and carry in signal C is (1, 0), that is, when the combination of the logic values of input signals A and B and carry in signal C is (1, 0, 0) and (0, 1, 0), will be explained.

In this case, since the logic value of signal XOR is 1, transmission gate 402 of carry signal calculation circuit 44 will be off, and transmission gate 404 will be on. Thus, transmission gate 404 will pass complemented carry in signal C (logical 1). Complemented carry in signal C, which is passed by transmission gate 404, is again complemented by inverter INV403 and a logical 0 is output as carry out signal $C_{out}$.

At the same time, transmission gate 408 of sum signal calculation circuit 46 will be off, and transmission gate 410 will be on. Thus, transmission gate 410 will pass carry in signal C (logical 0). Carry in signal C, which is passed by transmission gate 410, is complemented by inverter INV407 and a logical 1 is output as sum signal $S_{out}$.

Next, the operation of full adder 4 when the combination of the logic values of signal XOR and carry in signal C is (0, 1), that is, when the combination of the logic values of input signals A and B and carry in signal C is (0, 0, 1) and (1, 1, 1) will be explained.

In this case, since the logic value of signal XOR is 0, transmission gate 402 of carry signal calculation circuit 44 will be on, and transmission gate 404 will be off. Thus, transmission gate 402 will pass complemented input signal B. Complemented input signal B, which is passed by transmission gate 402, is again complemented by inverter INV403 and output as carry out signal $C_{out}$. That is, when the combination of the logic values of input signals A and B and carry in signal C is (0, 0, 1), carry signal calculation circuit 44 will output a logical 0 as carry out signal, and when it is (1, 1, 1), carry signal calculation circuit 44 will output a logical 1 as carry out signal.

At the same time, transmission gate 408 of sum signal calculation circuit 46 will be on, and transmission gate 410 will be off. Thus, transmission gate 408 will pass complemented carry in signal C (logical 1). Complemented carry in signal C, which is passed by transmission gate 408, is again complemented by inverter INV407 and a logical 0 is output as sum signal $S_{out}$.

Next, the operation of full adder 4 when the combination of the logic values of signal XOR and carry in signal C is (1, 1), that is, when the combination of the logic values of input signals A and B and carry in signal C is (1, 0, 1) and (0, 1, 1), will be explained.

In this case, since the logic value of signal XOR is 1, transmission gate 402 of carry signal calculation circuit 44 will be off, and transmission gate 404 will be on. Thus, transmission gate 404 will pass complemented carry in signal C (logical 0). Complemented carry in signal C, which is passed by transmission gate 404, is again complemented by inverter INV403 and a logical 1 is output as carry out signal $C_{out}$.

At the same time, transmission gate 408 of sum signal calculation circuit 46 will be off, and transmission gate 410 will be on. Thus, transmission gate 410 will pass carry in signal C (logical 0). Carry in signal C, which is passed by transmission gate 408, is complemented by inverter INV407 and a logical 0 is output as sum signal $S_{out}$.

Also, full adder 4 has the same advantages as full adder 3 shown in the Application Example 3 and is appropriate when full addition at increased speed is desired.

Embodiment 5

A fifth embodiment of the present invention will be explained, with reference to FIG. 7.

Figure 7:
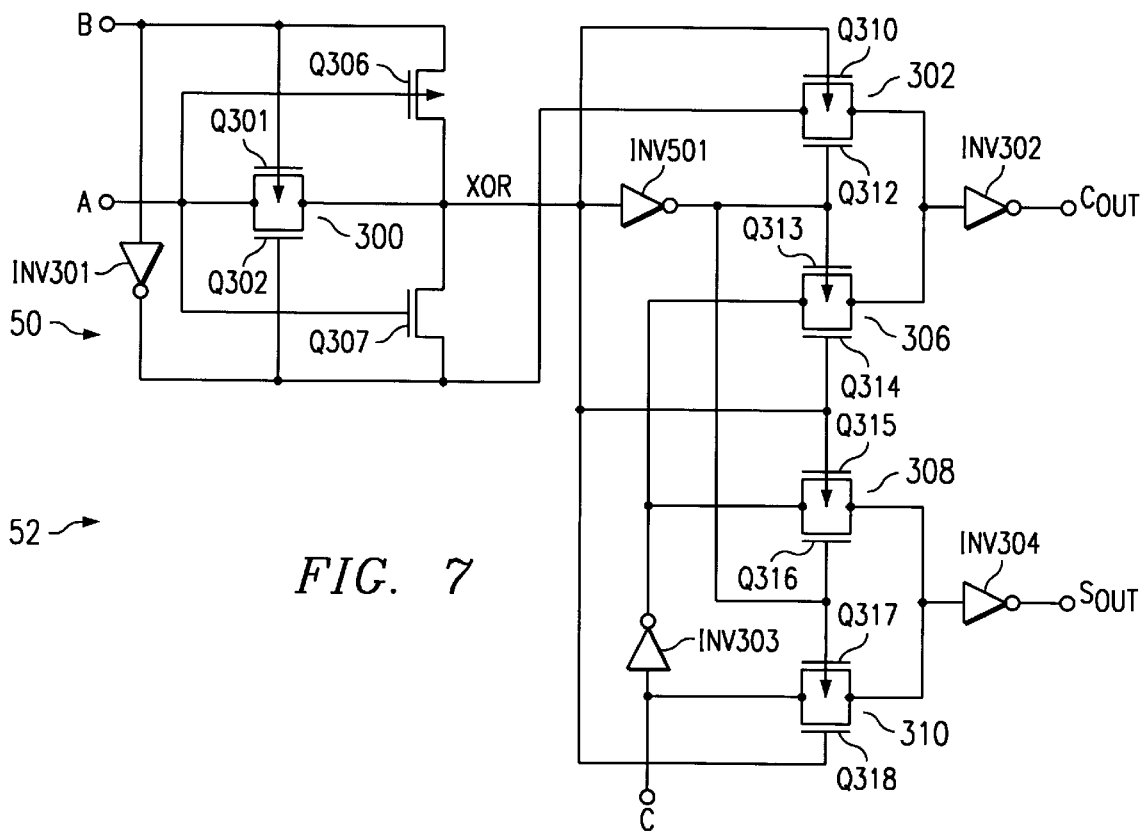
FIG. 7 shows a fifth embodiment of a full adder of the present invention.
Figure 8:
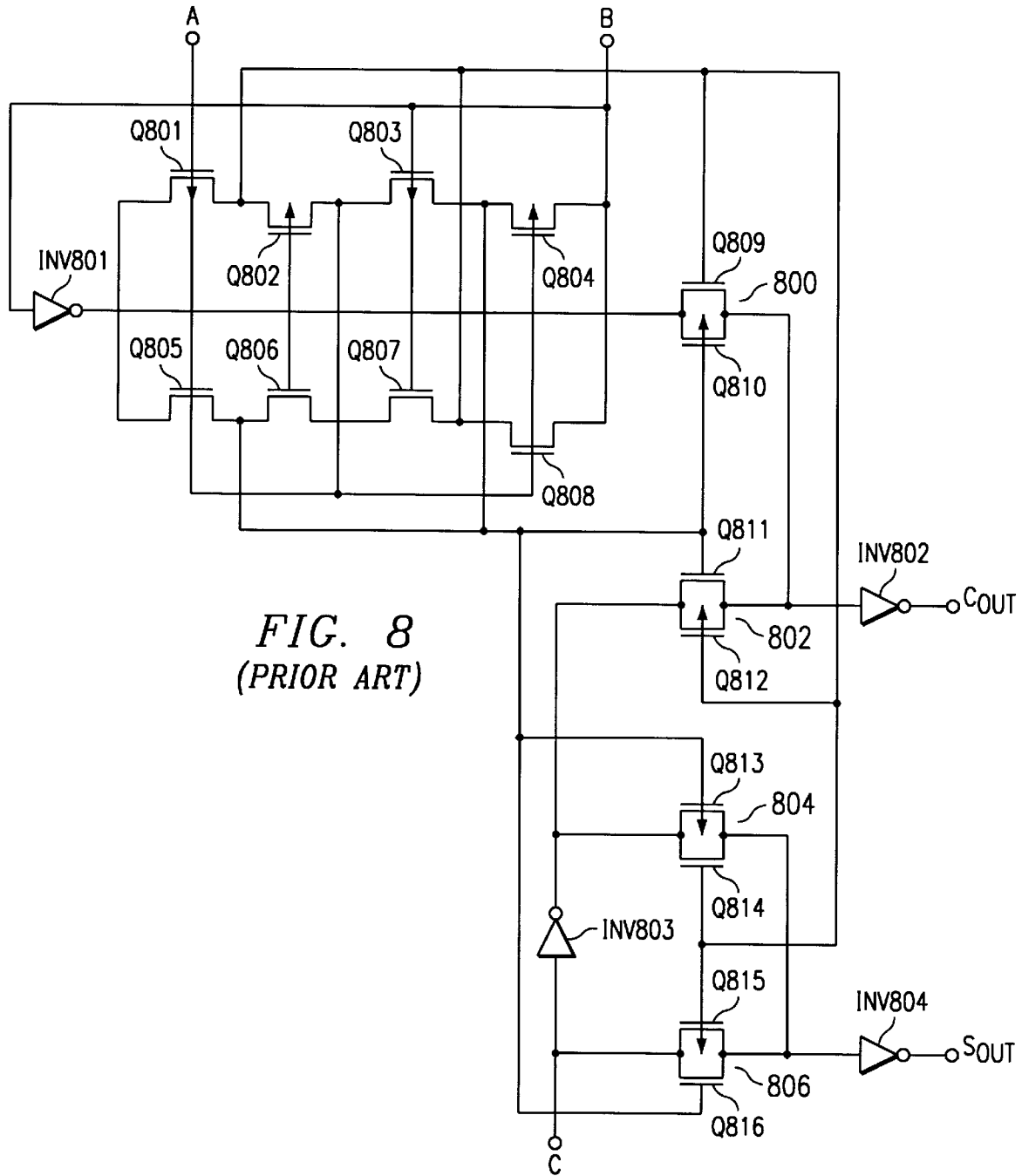
FIG. 8 shows a conventional full adder.

FIG. 7 shows the constitution of full adder 5 of the present invention in a fifth application example. Note that the structural elements of full adder 5, which are not described here, will be the same as the structural elements in full adder 3 to which the same symbols as in FIG. 5 are attached.

Full adder 5 is a modification example of full adder 3, shown in the Application Example 3. The construction of full adders 3 and 4, shown in the Application Examples 3 and 4, has been simplified and the area that it occupies on a semiconductor has been reduced with hardly any increase in the full addition speed.

Full adder 5 is composed of XOR gate 50 and carry signal/sum signal calculation circuit 52.

XOR gate 50 has the same constitution and function as XOR gate 30 shown in the Application Example 3, except that input signals A and B are reversed.

Carry signal/sum signal calculating circuit 52 has the same constitution and function as carry signal/sum signal calculation circuit 34, except that it has inverter INV501. That is, carry signal/sum signal calculating circuit 52 is used for full addition to produce the XNOR signal produced by XNOR gate 32 in full adder 3 by complementing the logic value of the XOR signal with inverter INV501.

In full adder 5, there are more circuit input terminals connected to transmission gate 300 than in full adders 3 and 4, so that the operating speed will be somewhat slower. At the same time, the number of transistors used for full adder 5 is 22. Thus, full adder 5 is suitable for increasing the integration level of semiconductor elements where high-speed processing as fast as with full adders 3 and 4 is not required.

Also, even when input signals A and B are reversed for sum signal calculation circuit 10, sum signal calculation circuit 20, XOR gates 30, 40 and 50, and XNOR gates 32 and 42 shown in each application example, exactly the same operation will be carried out as long as the timing of the changes in logic values of input signals A and B is the same. Thus, the case where input signal A corresponds to the first input signal according to the present invention and input signal B corresponds to the second input signal according to the present invention, and the opposite case are both feasible.

Addition signal generation circuits 12 and 22, carry signal calculation circuits 16, 26 and 44, XOR gates 30, 40, 42 and 50, XNOR gate 32, sum signal generation circuits 14, 24 and 46, and carry signal/sum signal calculation circuits 34 and 52 in each of the application examples discussed above can be used independently, so they can be combined appropriately for the application to construct full adders.

Thus, the full adder of the present invention can assume various modifications of those shown in each of the application examples discussed above.

The full adder of the present invention discussed above can provide fast processing at low power supply voltage and low power consumption; furthermore, a small area will be occupied on semiconductor elements.

In addition, with the full adder of the present invention, the processing times for the various combinations of input signals, and variation in the processing times needed for sum signal calculation and in the processing time needed for carry out signal calculation, can be made smaller. Also, with DSP semiconductor elements that use the full adder of the present invention, fast operation at low power supply voltage and at low power consumption will be possible. Thus, the range of DSP applications can be expanded, for example, digital cellular communications peripherals which use batteries as their power supply.

I claim:

1. A full adder circuit comprising:

first and second inputs for receiving first and second binary input signals, respectively, to be summed;

an exclusive OR circuit for exclusive ORing said first and second input signals for providing a third signal;

an input terminal receiving a carry-in signal;

a sum circuit comprising first and second transfer gates coupled to receive said third signal for controlling the operation of said transfer gates, said first transfer gate receiving said carry-in signal and said second transfer gate receiving a complement of said carry-in signal, said third signal controlling said transfer gates to pass said carry-in signal or said complement of said carry-in signal to an output of said full adder circuit;

wherein said exclusive OR circuit includes a pass gate, said pass gate comprising an NMOS and PMOS transistor controlled by said first binary signal for passing said second binary signal when said first binary signal is in a first state and for blocking said second binary signal when said first binary signal is in a second state, and an inverter having said first binary signal as an input for providing the complement of said first binary signal, said inverter having an output driving the gate of said NMOS transistor.

2. The full adder of claim 1 wherein said carry-in signal is valid before said third signal is fixed, whereby the speed of the full adder is increased.

3. The full adder of claim 1 further comprising a carry-out circuit which calculates a carry-out signal independent of said third signal.

4. A full adder circuit comprising:

first and second inputs for receiving first and second binary input signals, respectively, to be summed;

an exclusive OR circuit for exclusive ORing said first and second input signals for providing a third signal;

an input terminal receiving a carry-in signal;

a sum circuit which provides a sum output based on said third signal and said carry-in;

wherein said exclusive OR circuit includes a pass gate, said pass gate comprising an NMOS and PMOS transistor controlled by said first binary signal for passing said second binary signal when said first binary signal is in a first state and for blocking said second binary signal when said first binary signal is in a second state, and an inverter having said first binary signal as an input for providing the complement of said first binary signal, said inverter having an output driving the gate of said NMOS transistor.

5. The full adder of claim 4 further comprising a carry-out circuit which calculates a carry signal independent of said third signal.

6. The full adder of claim 4 wherein said carry-in signal is valid before said third signal is fixed, whereby the speed of the full adder is increased.

* * * * *

UNITED STATES PATENT AND TRADEMARK OFFICE
CERTIFICATE OF CORRECTION

PATENT NO. : 5,875,124
DATED : Feb. 23, 1999
INVENTOR(S) : Hiroshi Takahashi, Saitama-Ken, Japan.

It is certified that error appears in the above-identified patent and that said Letters Patent is hereby corrected as shown below:

On the title page item [73], change the assignee from

"Texas Instruments Japan, Ltd., Tokyo, Japan" to Texas Instruments

Incorporated, Dallas, Tex.

Signed and Sealed this

Seventh Day of December, 1999

Attest:

Q. TODD DICKINSON

*Attesting Officer*  *Acting Commissioner of Patents and Trademarks*